United States Patent
Lee et al.

(10) Patent No.: US 12,237,535 B2
(45) Date of Patent: Feb. 25, 2025

(54) FLAME-RETARDANT SEPARATOR INCLUDING POROUS SUBSTRATE WITH CRYSTALLINE SULFONYL-CONTAINING METAL SALT, AND ELECTROCHEMICAL DEVICE HAVING THE SAME

(71) Applicant: UBATT INC., Seoul (KR)

(72) Inventors: Chang Kyoo Lee, Seoul (KR); Jung Hwan Kim, Daejeon (KR); Keun Ho Choi, Daejeon (KR); Geon Hee Lee, Daejeon (KR)

(73) Assignee: UBATT INC., Seoul (KR)

( * ) Notice: Subject to any disclaimer, the term of this patent is extended or adjusted under 35 U.S.C. 154(b) by 486 days.

(21) Appl. No.: 17/595,020

(22) PCT Filed: Jun. 21, 2021

(86) PCT No.: PCT/KR2021/007720
§ 371 (c)(1),
(2) Date: Nov. 5, 2021

(87) PCT Pub. No.: WO2022/035040
PCT Pub. Date: Feb. 17, 2022

(65) Prior Publication Data
US 2022/0311092 A1    Sep. 29, 2022

(30) Foreign Application Priority Data

Aug. 14, 2020 (KR) .................. 10-2020-0102379
Jun. 18, 2021 (KR) .................. 10-2021-0079324

(51) Int. Cl.
*H01M 50/446* (2021.01)
*H01M 50/491* (2021.01)

(52) U.S. Cl.
CPC ....... *H01M 50/446* (2021.01); *H01M 50/491* (2021.01)

(58) Field of Classification Search
CPC .................. H01M 50/446; H01M 50/491
(Continued)

(56) References Cited

U.S. PATENT DOCUMENTS

| 2015/0214529 A1* | 7/2015 | Yawata | H01M 50/44 |
| | | | 429/144 |
| 2016/0164059 A1 | 6/2016 | Hong et al. | |

(Continued)

FOREIGN PATENT DOCUMENTS

| CN | 103460444 A | 12/2013 | |
| CN | 106654362 A * | 5/2017 | ........ H01M 10/0525 |

(Continued)

OTHER PUBLICATIONS

International Search Report of PCT Application No. PCT/KR2021/007720—3 pages (Sep. 29, 2021).

(Continued)

*Primary Examiner* — Sean P Cullen
(74) *Attorney, Agent, or Firm* — CANTOR COLBURN LLP

(57) ABSTRACT

Provided is a composite separator for an electrochemical device, and the composite separator according to the present invention includes a porous substrate and a crystalline metal salt. The composite separator may serve as a salt source to a liquid electrolyte of the electrochemical device, and additionally or independently, may have flame retardancy by the metal salt.

16 Claims, 13 Drawing Sheets

(58) Field of Classification Search
USPC .................................... 429/144, 251, 254
See application file for complete search history.

(56) References Cited

U.S. PATENT DOCUMENTS

| | | | | |
|---|---|---|---|---|
| 2017/0229743 | A1* | 8/2017 | Ito | H01M 50/578 |
| 2019/0229320 | A1* | 7/2019 | Gallagher | H01M 50/426 |
| 2020/0203695 | A1* | 6/2020 | Baba | H01M 50/451 |
| 2020/0243827 | A1* | 7/2020 | Morikawa | H01M 10/058 |
| 2020/0251744 | A1* | 8/2020 | Takada | H01M 4/668 |
| 2021/0159498 | A1* | 5/2021 | Goto | H01M 50/451 |
| 2022/0115739 | A1* | 4/2022 | Xu | H01M 4/625 |

FOREIGN PATENT DOCUMENTS

| | | | | |
|---|---|---|---|---|
| CN | 110247111 | A | | 9/2019 |
| CN | 110391382 | A | | 10/2019 |
| CN | 110783512 | A | * | 2/2020 ........ H01M 10/0525 |
| CN | 111095648 | A | | 5/2020 |
| DE | 102018200973 | A1 | | 7/2019 |
| JP | 2019-129119 | A | | 8/2019 |
| KR | 10-2016-0069431 | A | | 6/2016 |
| KR | 10-2018-0023340 | A | | 3/2018 |
| KR | 10-2019-0122469 | A | | 10/2019 |
| TW | 201637265 | A | | 10/2016 |
| WO | 2017-126701 | A1 | | 7/2017 |
| WO | WO 2018/038510 | A1 | | 3/2018 |
| WO | WO 2019/065062 | A1 | | 4/2019 |
| WO | WO 2019/107067 | A1 | | 6/2019 |
| WO | WO 2019/107068 | A1 | | 6/2019 |
| WO | WO-2019131193 | A1 | * | 7/2019 ............ H01M 10/05 |

OTHER PUBLICATIONS

Chinese Office Action for Application No. 202180002995.3 dated May 10, 2024 (in 8 pages).

Chinese Office Action—Chinese Application No. 202180002995.3 issued on Dec. 16, 2024, citing TW 201637265.

* cited by examiner

Comparative Example 3

Example 7

FLAME-RETARDANT SEPARATOR INCLUDING POROUS SUBSTRATE WITH CRYSTALLINE SULFONYL-CONTAINING METAL SALT, AND ELECTROCHEMICAL DEVICE HAVING THE SAME

TECHNICAL FIELD

The present invention relates to a separator for an electrochemical device, and more particularly, to a separator for an electrochemical device which may have improved flame retardancy and/or improved ionic conductivity, and, additionally or independently, allows implementation of an electrochemical device provided with a high-concentration electrolyte.

BACKGROUND ART

According to the trend of high performance, light weight, and large size for automotive power supplies and the like of an electrochemical device, a study on high-energy density and large capacity is being actively conducted. A study for high capacity and high output is conducted for each element forming the electrochemical device, such as development of electrode materials which may implement higher energy density, a separator which is thinner and has improved wettability, and an electrolyte solution having improved conductivity; however, for commercialization of medium and large-sized electrochemical devices for electric vehicles and the like, most of all, securing safety (elimination of explosion hazard) should be essentially predetermined.

A separator serves to prevent short circuits by cutting off physical contact between two electrodes in an electrochemical device and also to provide a passage of ions, and when a temperature of an electrochemical device is excessively high, the separator provides a closure function in which the separator is partly melted for cutting off the current to block pores.

For high capacity and high output of an electrochemical device, a separator which has low closure temperature and higher short circuit temperature, has a small thermal shrinkage, has an excellent cycle function depending on a high ionic conductivity, and has excellent electrolyte solution wettability is needed, and for securing safety of an electrochemical device, most of all, development of a separator having excellent flame retardancy is demanded.

DISCLOSURE

Technical Tasks

An object of the present invention is to provide a separator having excellent flame retardancy.

Another object of the present invention is to provide a separator having improved thermal stability.

Another object of the present invention is to provide a separator having improved ionic conductivity.

Another object of the present invention is to provide a separator having excellent liquid electrolyte wettability.

Another object of the present invention is to provide a separator which may implement an electrochemical cell provided with a high-concentration liquid electrolyte.

Another object of the present invention is to provide an electrochemical cell in which one or more properties of flame retardancy, thermal stability, ionic conductivity, electrolyte solution wettability, and productivity are improved, and a manufacturing method thereof.

Still another object of the present invention is to provide a coating solution used in the manufacture of an electrochemical cell in which one or more properties of flame retardancy, thermal stability, ionic conductivity, electrolyte solution wettability, and productivity are improved.

Technical Solution

In one general aspect, a composite separator, which is for an electrochemical device, includes a porous substrate and a crystalline metal salt.

In the composite separator according to an exemplary embodiment, the metal salt may include a metal salt containing a sulfonyl group.

In the composite separator according to an exemplary embodiment, the porous substrate may include a porous film, and the metal salt may be positioned on a surface of the porous film.

In the composite separator according to an exemplary embodiment, the porous substrate may include a porous film; and a porous coating layer positioned on at least one side surface of the porous film, and the metal salt may be positioned in one or more areas of an interface between the porous film and the porous coating layer, an inside of the porous coating layer, and a surface of the porous coating layer.

In the composite separator according to an exemplary embodiment, the porous coating layer may include inorganic particles, organic particles, organic and inorganic composite particles, or mixed particles thereof.

In the composite separator according to an exemplary embodiment, the metal salt containing a sulfonyl group may be any one or more selected from compounds satisfying the following Chemical Formulae 1 to 4:

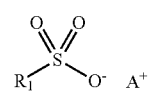

(Chemical Formula 1)

wherein $A^+$ is a monovalent cation, and $R_1$ is F, $CFH_2$, $CF_2H$, or $C_nF_{2n+1}$ (n is a natural number of 1 or more),

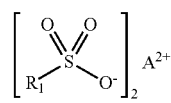

(Chemical Formula 2)

wherein $A^{2+}$ is a divalent cation, and $R_1$ is F, $CFH_2$, $CF_2H$, or $C_nF_{2n+1}$ (n is a natural number of 1 or more),

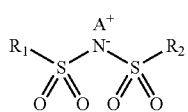

(Chemical Formula 3)

wherein $A^+$ is a monovalent cation, and $R_1$ and $R_2$ are independently of each other F, $CFH_2$, $CF_2H$, or $C_nF_{2n+1}$ (n is a natural number of 1 or more), and (Chemical Formula 4)

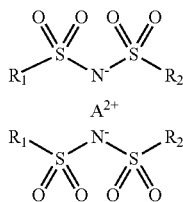

wherein $A^{2+}$ is a divalent cation, and $R_1$ and $R_2$ are independently of each other F, $CFH_2$, $CF_2H$, or $C_nF_{2n+1}$ (n is a natural number of 1 or more).

In the composite separator according to an exemplary embodiment, the composite separator may be a salt source for supplying a metal salt to an electrolyte provided in an electrochemical device.

In the composite separator according to an exemplary embodiment, the metal salt may be fixed by a binding component of any one or more selected from linear polymers and crosslinked polymers.

In the composite separator according to an exemplary embodiment, the fixation may be formed by a curing component having curability, which is converted into the binding component by curing, in a state of being mixed with the metal salt.

In the composite separator according to an exemplary embodiment, the composite separator may include the coating layer including the metal salt, positioned on one side surface of the porous substrate.

In the composite separator according to an exemplary embodiment, the porous substrate may include a porous film; and a porous coating layer positioned on at least one side surface of the porous film; and the composite separator may include a coating layer including the metal salt, and the coating layer including the metal salt may be positioned between the porous film and the porous coating layer, on a surface area of the porous coating layer, or between the porous film and the porous coating layer and the surface area of the porous coating layer, respectively.

In the composite separator according to an exemplary embodiment, the coating layer including the metal salt may further include one or more polymers selected from linear polymers and crosslinked polymers.

In the composite separator according to an exemplary embodiment, a content of the metal salt may be 0.1 to 5.0 mg/cm², the content of the metal salt being a mass of the metal salt per unit area of the porous substrate.

In the composite separator according to an exemplary embodiment, a metal ion of the metal salt may include an active ion, the active ion being a metal ion participating in an electrochemical reaction of an electrochemical device provided with the composite separator.

The composite separator according to an exemplary embodiment may satisfy the following Equation 1:

$$5(\%) \leq (W_{dry} - W_{wet})/W_m \times 100(\%) \quad \text{(Equation 1)}$$

wherein $W_{dry}$ is a mass of the composite separator before the separator comes into contact with an electrolyte solution, $W_{wet}$ is a mass of the composite separator which is recovered and dried after immersing the composite separator in a reference electrolyte solution in which $LiPF_6$ is dissolved at a concentration of 1 M in a mixed solvent of ethylene carbonate and dimethyl carbonate at a volume ratio of 1:1 at a temperature of 25° C. for 1 hour, and $W_m$ is a mass of a metal salt included in the composite separator before the separator comes into contact with the electrolyte solution.

In another general aspect, a flame retardant separator is provided.

The flame retardant separator according to the present invention does not cause a flame in the following flame retardancy test which is carried out at the point when a droplet does not fall from the separator to the bottom for 1 minute in the case in which the separator is impregnated with the following reference electrolyte for 1 minute and then recovered, and immediately after the recovery, the separator is positioned so that a gravity direction and an in-plane direction of the separator are parallel to each other:

reference electrolyte: a mixed solvent of ethylene carbonate and dimethyl carbonate at a volume ratio of 1:1, a lithium salt of $LiPF_6$, a concentration of $LiPF_6$ of 1 M, and a temperature of 25° C. 5° C., flame retardancy test: length of flame in the air=5 to 10 cm, temperature of flame tip=1000 to 1500° C., length of flame area which is not in contact with the separator when applying a flame to the separator=50 to 80% of the length of flame in the air, and flame movement speed in a state of being in contact with the separator=1 to 5 cm/sec.

In another general aspect, an electrochemical device includes the composite separator for an electrochemical device described above.

In another general aspect, an electrochemical device includes the flame retardant separator described above.

In the electrochemical device according to an exemplary embodiment, a molar concentration of an active ion salt included in the electrolyte may be 0.5 to 6.0 M, the active ion being a metal ion participating in an electrochemical reaction of the electrochemical device.

The electrochemical device according to the present invention includes a positive electrode; a negative electrode; a separator interposed between the positive electrode and the negative electrode; and an electrolyte, wherein the electrolyte is a high-concentration electrolyte including 1 M or more of an active ion salt, the active ion being a metal ion participating in an electrochemical reaction, the separator has an ionic conductivity of 0.3 mS/cm or more in a state of being wet in the electrolyte, and the active ion of the separator has an ion migration coefficient of 0.3 or more.

In another general aspect, an electrochemical module (secondary battery module) includes two or more of the electrochemical devices described above which are electrically connected.

In still another general aspect, an apparatus includes an energy storage device including the electrochemical device, the energy storage device supplying electric power.

Advantageous Effects

The composite separator according to an exemplary embodiment of the present invention includes a crystalline metal salt, so that a low-concentration electrolyte may be converted into a high-concentration electrolyte inside an electrochemical device.

The composite separator according to an exemplary embodiment of the present invention includes a metal salt containing a sulfonyl group having crystallinity, and shows flame retardancy, and furthermore, significantly improved ionic conductivity.

The composite separator according to the present invention may implement an electrochemical device which allows adoption of previously established process and materials substantially as they are without substantially excessively changing constituent members and a manufacturing process which has been previously well established in an electrolyte solution-based electrochemical device, does not cause wettability deterioration and reduced productivity, and is provided with a high-concentration liquid electrolyte, and an electrochemical device which has flame retardancy to have improved safety, and/or an electrochemical device which has excellent electrochemical properties by improved ionic conductivity.

DESCRIPTION OF DRAWINGS

The above and other objects, features and advantages of the present invention will become apparent from the following description of preferred embodiments given in conjunction with the accompanying drawings, in which.

EMBODIMENTS

Figure 1:
FIG. 1 is a photograph in which flame retardancy of Example 3 is evaluated.

Hereinafter, the separator, the electrochemical device, and a manufacturing method thereof according to the present invention will be described in detail with reference to the accompanying drawings. The drawings to be provided below are provided by way of example so that the idea of the present invention can be sufficiently transferred to a person skilled in the art to which the present invention pertains. Therefore, the present invention is not limited to the drawings provided below but may be embodied in many different forms, and the drawings suggested below may be exaggerated in order to clarify the spirit of the present invention. Technical terms and scientific terms used herein have the general meaning understood by those skilled in the art to which the present invention pertains unless otherwise defined, and a description for the known function and configuration which may unnecessarily obscure the gist of the present invention will be omitted in the following description and the accompanying drawings.

In addition, the singular form used in the specification and claims appended thereto may be intended to also include a plural form, unless otherwise indicated in the context.

In the present specification and the appended claims, terms such as "first" and "second" are not used in a limited meaning but used for the purpose of distinguishing one constitutional element from other constitutional elements.

In the present specification and the appended claims, terms such as "comprise" or "have" mean that there is a characteristic or a constitutional element described in the specification, and as long as it is not particularly limited, a possibility of adding one or more other characteristics or constitutional elements is not excluded in advance.

In the present specification and the appended claims, when portions such as a film (layer), a region, and a constitutional element are present on another portion, not only a case in which the portion is in contact with and directly on another portion but also a case in which other films (layers), other regions, other constitutional elements are interposed between the portions is included.

An electrode assembly having a positive electrode/separator/negative electrode forming an electrochemical device usually has an outer surface covered with a separation film and the separation film is present in multiple layers on a side surface of some full cells or bi-cells, and thus, wettability is deteriorated in impregnation with an electrolyte solution and it takes a long time to manufacture the device.

In medium and large electrochemical devices requiring safety, output/energy density, and long life characteristics, high concentration of an electrolyte is demanded, and the high-concentration electrolyte has the following merits: (1) improved safety: when an electrolyte salt is highly concentrated, free-solvent molecules which do not participate in solvation are greatly decreased, and thus, volatility is suppressed to have flame retardancy properties, and a side reaction of solvent molecules involved in charge and discharge processes is suppressed; (2) improved electrochemical properties: in a high-concentration electrolyte having few free-solvent molecules, active ions are moved by a migration mechanism changing from a conventional vehicle type to hopping between metal salt-solvent composite, and thus, ionic conductivity of the active metal salt is increased, and in addition, in the case of a low-concentration electrolyte having many free-solvent molecules, it is known that an SEI component of a high-concentration electrolyte mainly shows an anion-derived component as compared with an SEI component in which a reduction reaction of a solvent is dominant and an anion-derived SEI lowers resistance of a charge transfer reaction (electron transfer reaction) of an active metal salt in an interface of electrode/electrolyte to improve output characteristics; (3) improved life characteristics: in addition to the improved output density mentioned, a high-concentration electrolyte having few free-solvent molecules suppresses an elution problem of transition metal ions causing a battery life and safety issue and improves battery life characteristics.

However, as the electrolyte solution is concentrated, ionic strength is increased, so that a high-concentration electrolyte has a high viscosity. The viscosity of a low-concentration electrolyte which is commonly used is about 3 mPa, but the viscosity of 5.5 M lithium bis(fluorosulfonyl)imide/dimethyl carbonate (LiFSI/DMC) which is known as a representative high-concentration electrolyte is about 240 mPa which is very high, and thus, the problems related to wettability mentioned above get worse to deteriorate quality uniformity and productivity of a battery.

The present applicant continuously conducted a study on an electrochemical device provided with a high-concentration liquid electrolyte, and as a result, developed a technology allowing implementation of an electrochemical device which may adopt previously established process and materials substantially as they are without substantially excessively changing constituent members and a manufacturing process which was previously well established in a small electrochemical device, that is, a low-concentration electrolyte solution-based electrochemical device, and is provided with a high-concentration liquid electrolyte without causing deterioration of wettability and reduced productivity.

In addition, in the process of an in-depth study of the technology, in the case of specific materials, it was confirmed that high flame retardancy is imparted to an electrochemical device, and also, electrochemical properties are improved together with securing flame retardancy, thereby completing the present invention.

The composite separator according to the present invention, which is a composite separator for an electrochemical device, includes a porous substrate and a crystalline metal salt.

In the present invention, the composite separator including the crystalline metal salt may mean that there are at least one or more diffraction peaks of the metal salt in the X-ray diffraction pattern of the composite separator, and may mean that there is a diffraction peak of a crystal plane in the known crystal structure of the metal salt. The X-ray diffraction pattern of the composite separator may use a Cu Kα ray. Here, the X-ray diffraction pattern of the metal salt which is a criterion for the existence of the crystalline metal salt may be based on the previously established library (JCPDS, ICSD, CSD), or may be based on the X-ray diffraction pattern of crystalline metal salt powder in the previously established library.

The composite separator according to an exemplary embodiment of the present invention includes the metal salt together with the porous substrate, thereby supplying the metal salt to a liquid electrolyte when the separator comes into contact with the liquid electrolyte, and the liquid electrolyte in contact with the composite separator may have an increased salt concentration.

As described above, the composite separator according to an exemplary embodiment may supply the metal salt to the liquid electrolyte, when being provided in a liquid electrolyte-based electrochemical cell. Thus, the liquid electrolyte may be converted into a high-concentration electrolyte in the electrochemical cell, by the composite separator.

In this respect, the composite separator according to an exemplary embodiment of the present invention may include a porous substrate; and a crystalline metal salt which may be dissolved in a liquid medium (in a soluble form) when the separator comes into contact with a liquid medium including a solvent of the metal salt. Here, the solvent of the metal salt may be construed as a liquid material which has a solubility in the metal salt of 0.1 g or more/100 g of the liquid material, specifically 0.5 g or more/100 g of the liquid material, and more specifically 1.0 g or more/100 g of the liquid material at room temperature (10 to 30° C.) under atmospheric pressure.

In addition, experimentally, the metal salt being dissolved in a liquid medium or the metal salt included in the composite separator being in a soluble state when coming into contact with the liquid medium, means that the composite separator satisfies the following Equation 1:

$$5(\%) \leq (W_{dry} - W_{wet})/W_m \times 100(\%) \quad \text{(Equation 1)}$$

wherein $W_{dry}$ is a mass of the composite separator before the separator comes into contact with an electrolyte solution, $W_{wet}$ is a mass of the composite separator which is recovered and dried after immersing the composite separator in a reference electrolyte solution in which $LiPF_6$ is dissolved at a concentration of 1 M in a mixed solvent of ethylene carbonate and dimethyl carbonate at a volume ratio of 1:1 at a temperature of 25° C. for 1 hour, and $W_m$ is a mass of a metal salt included in the composite separator before the separator comes into contact with the electrolyte solution. Here, the recovered composite separator may be dried under the conditions in which the solvent of the reference electrolyte is all volatilized and removed, and as an example, may be dried by vacuum drying, heating drying performed at 60 to 120° C. for 1 to 24 hours, hot-air drying, or the like, but the present invention is not limited thereto. In addition, a volume of the reference electrolyte solution in which the composite separator is completely submerged may be a degree at which the mass of the composite separator is not affected by the volume of the reference electrolyte solution after coming into contact with the electrolyte solution, and as an example, the volume of the reference electrolyte solution may be about 50 to 1000 times the apparent volume of the composite separator, but the present invention is not necessarily limited thereto.

Equation 1 refers to a dissolution rate (%) at which the metal salt included in the composite separator is dissolved when immersing the composite separator in the reference electrolyte solution for 1 hour. The composite separator according to an exemplary embodiment may have a dissolution rate of 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, 95% or more, or substantially 100%, the dissolution rate being as defined by $(W_{dry} - W_{wet})/W_m \times 100(\%)$ of Equation 2. A dissolution rate of 100% means that the metal salt included in the composite separator is all dissolved in the reference electrolyte solution before the separator comes into contact with the electrolyte solution.

Since the composite separator includes the metal salt in a crystal form, the separator may have a dissolution rate as defined in Equation 1, regardless of whether there is a binder (binding component) described later. However, when the crystalline metal salt is bound (including adsorbed) to the porous substrate as the crystalline metal salt alone without the binder (binding component), the separator may have a high dissolution rate of 30% or more, 40% or more, 50% or more, 60% or more, 70% or more, 80% or more, 90% or more, or substantially 100%. With the composite separator having such a high dissolution rate, an electrochemical device which is provided with a high-concentration electrolyte without causing a problem arising in a conventional high-concentration electrolyte may be manufactured, only by a previously-established known process of introducing an electrode assembly including a positive electrode, a separator, and a negative electrode in a case of the electrochemical device and injecting a liquid electrolyte (a liquid electrolyte having a lower concentration than a desired salt concentration to be easily injected).

It is preferred that the composite separator which serves as a salt source for converting a low-concentration electrolyte into a high-concentration electrolyte inside the electrochemical device by injecting the low-concentration electrolyte includes a metal salt of an active ion as the crystalline metal salt. That is, by using the metal ion which participates in the electrochemical reaction of the electrochemical device provided with the composite separator as the active ion, it is preferred that the metal ion of the crystalline metal salt includes the active ion, and substantially, the crystalline metal salt is a crystalline salt of the active ion. Here, a solute (electrolyte salt) included in the low-concentration electrolyte and the crystalline metal salt included in the composite separator may be the same kind or different kinds of materials from each other.

Even after the composite separator comes into contact with a liquid medium including a liquid electrolyte or a solvent which is injected in the manufacturing process of an electrochemical device to provide the metal salt as a solute (electrolyte salt), the concentration of the metal salt in the porous substrate (including the meaning of abutment) may be maintained for a long time in a state of being relatively high as compared with a positive electrode and a negative electrode. Depending on a concentration gradient formed by a separator (composite separator)-derived metal salt, electrolyte components in the separator, the positive electrode, and the negative electrode have different surface tensions from each other, and in an electrochemical device having no separate external force such as convention force, a concentration of the separator-derived metal salt may be maintained for a long time in a state of being relatively high as compared with the positive electrode and the negative electrode. By the concentration gradient, thermal stability or flame retardancy of the separator, and/or ionic conductivity of the active metal ion, and the like may be improved.

That is, in the electrochemical device manufactured by charging the electrode assembly including the positive electrode, the composite separator, and the negative electrode into a case, injecting a liquid electrolyte, and sealing the case, the concentrations of the solute (electrolyte salt) in an electrolyte area in contact with a composite separator side and an electrolyte area in contact with an electrode may be different from each other, even in the case in which the dissolution rate of the charged composite separator reaches 100%, and in the entire area of the electrolyte, the concentration (CH) in the electrolyte area in contact with the composite separator side may be relatively high and the concentration (CL) in the electrolyte area in contact with the electrode may be relatively low. That is, CH and CL may satisfy the relationship of CH>CL, substantially CH>1.5 CL. The liquid electrolyte having a non-uniform concentration may have a concentration gradient in which the concentration of the solute (electrolyte salt) is decreased in a direction from the composite separator to the electrode. Here, the concentration gradient may be substantially continuously decreased in a direction from the composite separator to the electrode.

In the composite separator according to an exemplary embodiment, considering the manufacturing process of a commercially available composite separator and considering active contact between the liquid electrolyte and the metal salt included in the composite separator and/or a large contact area, the crystalline metal salt may be positioned in the surface area of the porous substrate in the composite separator.

The crystalline metal salt positioned in the surface area of the porous substrate may include a metal salt in an adsorbed and/or fixed state. Here, adsorption may include physisorption and/or chemisorption. In addition, fixation may include fixation of the metal salt itself by bonding with the porous substrate and/or fixation by a different kind of material from the metal salt, that is, fixation by an external factor including a different kind of material. Here, when the different kind of material which fixes the metal salt is deformed (as an example, swollen) by or dissolved in a liquid medium or a solvent, and the metal salt may be changed into a soluble form in a liquid medium or a solvent.

The surface area of the porous substrate may refer to an area from 0.05 to 0.3 $t_{pm}$ in a thickness direction of the porous substrate in one surface, wherein $t_{pm}$ is a total thickness of the porous substrate (the shortest distance between the two widest surfaces facing each other), but is not limited thereto. The surface area of the porous substrate may be more substantially defined considering the specific structure of the porous substrate.

The porous substrate may include a porous film, and the porous film may be an insulator and may be microporous. The porous film may serve to prevent physical contact between electrodes and simultaneously to pass metal ions such as a lithium ion through pores, and is not limited as long as it is an organic or inorganic porous film commonly used as a separator in a secondary battery. As a specific example, the porous film may be a porous polymer film, woven fabric, non-woven fabric, or a laminated structure of two or more thereof, containing one or more selected from the group consisting of polyolefin-based resins, fluorine-based resins, polyester-based resins, polyacrylonitrile resins, and cellulose resins, but is not limited thereto. The thickness of the porous film may be in a range commonly used in a secondary battery field, and as an example, 1 to 1000 μm, specifically 10 to 800 μm, but is not limited thereto.

In a specific example, the crystalline metal salt may be positioned on the surface of the porous film. Here, the surface of the porous film may include not only the outermost surface of the porous film but also the surface by open pores (pores surface of open pores).

The porous substrate may include a porous film; and a porous coating layer positioned on at least one side surface or each of both side surfaces of the porous film.

The porous coating layer may include inorganic particles, organic particles, organic and inorganic composite particles, or a mixture thereof, and may be porous by an empty space between particles. Since a particle phase included in the porous coating layer (inorganic particles, organic particles, organic and inorganic composite particles, or a mixture thereof) does not cause an oxidation and/or reduction reaction in an operation voltage range of an electrochemical device, it is not particularly limited as long as it is electrochemically stable. Substantially, any particle phase may be used without particular limitation as long as it is used as a layer coated on an insulating microporous film for improved thermal resistance of the separator, increased strength, improved wettability of an electrolyte solution, improved ionic conductivity, and/or enhanced salt dissociation in an electrolyte solution, and the like. As an example, the inorganic particles may include metal oxides, metal carbides, metal alloys, metal phosphates, metal nitrides, mixtures thereof, composites thereof, or the like, and substantially, may include oxides, carbides, nitrides, phosphates, or alloys including one or more selected from the group consisting of Al, Ti, Ba, Pb, Zr, Sr, Hf, Li, Zn, Ce, Mg, Ca, Zn, Y, Nb, and Si, and the like, but are not limited thereto. In addition or in contrast, the inorganic particles may be a dielectric having a dielectric constant of 5 or more, specifically 10 or more, and as an example, may include $BaTiO_3$, $Pb(Zr,Ti)O_3$(PZT), $Pb_{1-x}La_xZr_{1-y}Ti_yO_3$(PLZT, $0<x<1$, $0<y<1$), $Pb(Mg_{1/3}Nb_{2/3})O_3$—$PbTiO_3$(PMN-PT), $HfO_2$, $SrTiO_3$, $SnO_2$, $CeO_2$, $MgO$, $Mg(OH)_2$, $NiO$, $CaO$, $ZnO$, $ZrO_2$, $SiO_2$, $Y_2O_3$, $Al_2O_3$, $AlOOH$, $Al(OH)_3$, $SiC$, and $TiO_2$, or mixture thereof, composites thereof, or the like, but are not limited thereto. In addition or in contrast, the inorganic particles may be an inorganic ion conductor, and as an example of a lithium secondary battery which is a representative example of the electrochemical device, lithium phosphate, lithium titanium phosphate ($Li_pTi_q(PO_4)_3$, $0<p<2$, $0<q<3$), lithium aluminum phosphate ($Li_aAl_bTi_c(PO_4)_3$, $0<a<2$, $0<b<1$, $0<c<3$), (LiAl-TiP)$_x$O$_y$-based glass ($x<4$, $0<y<13$), lithium lanthanum titanate ($Li_eLa_fTiO_3$, $0<e<2$, $0<f<3$), lithium germanium phosphate ($Li_xGe_yP_zS_w$, $0<x<4$, $0<y<1$, $0<z<1$, $0<w<5$), lithium nitride ($Li_kN_l$, $0<k<4$, $0<l<2$), $SiS_2$-based glass ($Li_mSi_nS_o$, $0<m<3$, $0<n<2$, $0<o<4$), $P_2S_5$-based glass ($Li_xP_yS_z$, $0<x<3$, $0<y<3$, $0<z<7$), a mixture thereof, a composite thereof, or the like may be included, but the present invention is not limited thereto. The particle phase may have a unimodal, a bimodal, or a trimodal size distribution (diameter distribution), and may have a size to implement a porosity by a particle phase empty space of a level of 20 to 80%, specifically 30 to 70%, and as an example, may have an average diameter of an order or $10^{-1}$ μm to $10^1$ μm, but the present invention is not limited thereto. A porous coating layer may be positioned on one surface or each of two surfaces facing each other of the porous film, and may have a lamination structure of two or more layers in which one or more of a particle phase material, a particle phase size, a content ratio of the particle phase included in the layer are different, but the present invention is not limited thereto. The thickness of the porous coating layer may be at a level of 0.01 to 0.3 based on the thickness of the porous film of 1, but is not limited thereto.

The porous coating layer may further include a binder (organic binder), and the binder may serve to bind the particle phase described above to the porous film. The binder may be any polymer binder commonly used in the electrochemical device field, and both a water-based polymer binder and a non-aqueous polymer binder may be used. An example of the polymer binder may include polyvinylidene fluoride (PVdF), polyvinylidene fluoride-hexafluoropropylene, polyvinylpyrrolidone, polyacrylonitrile, polyvinylidene fluoride-trichloroethylene, polyvinylidene fluoride-chlorotrifluoroethylene (PVdF-CTFE), polymethylmethacrylate, polyvinyl acetate, an ethylene-co-vinyl acetate copolymer, polyethylene oxide, cellulose acetate, cellulose acetate butylate, cellulose acetate propionate, cyanoethylpullulan, cyanoethyl polyvinyl alcohol, cyanoethyl cellulose, cyanoethyl sucrose, pullulan, carboxymethyl cellulose, an acrylonitrile styrene butadiene copolymer, polyimide, polyvinyl alcohol, carboxymethyl cellulose, starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, a mixture thereof, or the like, but is not limited thereto. The porous coating layer may include 5 to 50 parts by weight, specifically 10 to 40 parts by weight of the binder based on 100 parts by weight of the particle phase, but is not limited thereto.

In an exemplary embodiment, the crystalline metal salt may be positioned in one or more areas selected from an interface between the porous film and the porous coating layer, the inside of the porous coating layer, and the surface of the porous coating layer.

When the metal salt is positioned at the interface between the porous film and the porous coating layer, the metal salt may be substantially uniformly positioned on a boundary surface between the porous film and the porous coating layer, and on the other hand, may be selectively (partially) positioned in an area in contact with the pores of the porous coating layer (boundary area exposed by open pores) in the boundary between the porous film and the porous coating layer.

Additionally or independently, the metal salt may be positioned inside the porous coating layer. When the metal salt is positioned inside the porous coating layer, the metal salt may be positioned on the surface of the particle phase of the porous coating layer and/or the pore surface of the porous coating layer. A surface of the particle phase may include a surface by pores when the particles are porous, and the metal salt may be positioned partially or substantially on the surface of the particle phase. The inside of the porous coating layer may include the porous surface inside the porous coating layer. The pore surfaces are surfaces to partition pores inside the porous coating layer, and may be a binder surface area, a particle surface area excluding a contact area between particles or between particles and the binder, and the like. When the metal salt is positioned on the pore surface of the porous coating layer, the metal salt may be positioned on the part of or the entire of the pore surface, and when the metal salt is positioned on the part of the pore surface, the metal salt may be positioned on the pore surface adjacent to the surface (macroscopic outermost surface) of the porous coating layer.

Additionally or independently, the metal salt may be positioned on the surface of the porous coating layer. The surface of the porous coating layer may refer to a macroscopic outermost surface. The metal salt may be positioned partially or substantially uniformly on the outermost side surface of the porous coating layer.

As a substantial example, the metal salt may be positioned at an interface between the porous film and the porous coating layer, the porous surface inside the porous coating layer, and the surface (outermost surface) of the porous coating layer.

As another substantial example, the metal salt may be positioned on the surface (outermost surface) of the porous coating layer and in a part of the area of the pore surface inside the porous coating layer. Here, a part of the area of the internal pore surface may refer to an internal pores surface adjacent to the outermost surface, and as an example, may refer to a pore surface positioned in an area to a depth corresponding to 0.05 to 0.8, 0.1 to 0.7, 0.1 to 0.6, 0.1 to 0.5, 0.1 to 0.4, or 0.1 to 0.3 in the thickness direction of the porous coating layer on the surface (outermost surface) of the porous coating layer, based on the thickness of the porous coating layer of 1, but are not necessarily limited thereto.

As another substantial example, the metal salt may be positioned on the surface of the particle phase of the porous coating layer. That is, the particle phase of the porous coating layer may be in a state of being coated on the metal salt. Thus, the metal salt may be positioned in an area where the particle phase is positioned inside the porous coating layer, an area where the particle phase is positioned on the outermost surface of the porous coating layer, and an area where the particle phase is positioned on the boundary surface between the porous film and the porous coating layer. In a manufacturing method, the case in which the metal salt is positioned on the surface of the particle phase of the porous coating layer may correspond to the case in which the metal salt is adsorbed (coated) on the particle phase of the porous coating layer, and then a slurry including the particle phase on which the metal salt is adsorbed is used to form the porous coating layer.

The example described above is only an example in which the metal salt of the composite separator is well supplied to the liquid electrolyte when the composite separator and the liquid electrolyte come into contact, and the present invention may not be limited by the specific example as such, of course.

The metal salt positioned on the surface of the porous film, at the interface between the porous film and the porous coating layer, in the inside of the porous coating layer, and/or on the surface of the porous coating layer may be positioned in a state of being adsorbed in a molecule or cluster form, but is not necessarily limited thereto.

A content of the metal salt included in the composite separator may be determined by taking into account a concentration of the liquid electrolyte injected (injection concentration) to the electrochemical device in which the composite separator is provided and a concentration of the electrolyte to be desired (design concentration). That is, the composite separator may include the metal salt corresponding to a difference between a total amount (total moles) of the solute required for the design concentration and a total amount (total moles) included in the liquid electrolyte injected, and may include the metal salt in a larger amount than this. As a substantial example, the design concentration may be 1.1 M or more, 1.3 M or more, 1.5 M or more, 1.7 M or more, 1.9 M or more, 2.0 M or more, 2.1 M or more, or 2.2 M or more, and substantially, 6.0 M or less, 5.5 M or less, 5.0 M or less, 4.5 M or less, 4.0 M or less, 3.5 M or less, 3.0 M or less, or 2.5 M or less, but is not limited thereto. As an example, the design concentration may be 1.1 to 6.0 M, 1.3 to 5.5 M, 1.5 to 5.5 M, 1.7 to 5.5 M, 1.9 to 5.5 M, 2.0 to 5.5 M, 2.1 to 5.5 M, 2.2 to 5.5 M, 1.5 to 3.0 M, or 1.5 to 2.5 M. The injection concentration may be 0.3 to 1.0 M, 0.5 to 1.0 M, or 0.8 to 1.0 M. Here, in the design concentration and the injection concentration, the concentration of the salt may refer to a total concentration of the salt (electrolyte salt) of the metal ion (metal ion participating in the electrochemical reaction) dissolved in the electrolyte. Thus, the electrolyte salt dissolved in the electrolyte injected may be the same or a different kind of salt as or from the metal salt provided by the composite separator. The composite separator may include the metal salt at the equivalent to or higher than the content to increase the concentration of the liquid electrolyte from the injection concentration to the design concentration by coming into contact with the liquid electrolyte injected.

Here, since the wettability is a big problem in the high-concentration electrolyte, and an electrolyte injection process is difficult and takes a long time, a high-concentration electrolyte is mentioned as a more effective example, but this is only an advantageous example by the technical advantage of the composite separator according to an exemplary embodiment of the present invention, and a common liquid electrolyte having a design concentration of 1 M or less or about 1 M may be also produced inside the electrochemical device by the composite separator according to an exemplary embodiment of the present invention. As an extreme example, a solvent may be converted into a liquid electrolyte by the composite separator according to an exemplary embodiment of the present invention inside the electrochemical device. That is, in the manufacturing process of the electrochemical device, the solvent of the liquid electrolyte is introduced, the metal salt of the composite separator is dissolved in the introduced solvent inside the electrochemical device, and the liquid electrolyte may be produced inside the electrochemical device.

As a substantial and a non-limiting example, in the composite separator, a content of the metal salt which is a mass of the metal salt per unit area of the porous substrate may be 0.1 to 5.0 mg/cm$^2$, 0.2 to 4.0 mg/cm$^2$, or 0.2 to 3.0 mg/cm$^2$.

In an exemplary embodiment, the metal salt included in the composite separator may be any solute (electrolyte salt) used in a liquid electrolyte in the electrochemical device field. Specifically, the metal salt included in the composite separator may have a molecular weight (g/mol) of 1000 or less, specifically 500 or less, and more specifically 400 or less, and substantially, may have a molecular weight of 10 or more, 20 or more, or 30 or more. In addition, the metal salt included in the composite separator may have the number of anions per molecule of the metal salt of 1 to 4, specifically 1 to 3, and more specifically 1 or 2.

As a substantial example, when the metal ion participating in the electrochemical reaction of the electrochemical device is an active ion, the metal salt may be a salt providing the active ion as a cation and one or more ions selected from $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $AsF_6^-$, $BF_6^-$, $SbF_6^-$, $(CF_3)_6P^-$, $CF_3SO_3^-$, $CF_3CF_2SO_3^-$, $AlO_3^-$, $AlCl_4$, $C_4F_9SO(CF_3SO_2)_2N^-$, $(CF_3CF_2SO_2)_2N^-$, $(FSO_2)_2N^-$, $(C_2F_5SO_3)_2N^-$, $(F_3CF_2SO_2)_2N^-$ $(C_2F_5SO_2)_2N^-$, $(CF_3SO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $B_{10}Cl_{10}^-$, $C_4BO_8^-$, $B(C_2O_4)_2^-$, $CH_3SO_3^-$, and the like as an anion (counter ion of the active ion), and in particular, may be a sulfonyl group-containing crystalline metal salt described layer, but is not necessarily limited thereto. The metal salt included in the composite separator may be a salt of the active ion required for the corresponding composition, considering the specific composition of the designed liquid electrolyte. Based on a lithium secondary battery which is a representative electrochemical device, the active ion may be a lithium ion.

As described above, in the course of an in-depth study of a composite separator to serve as an electrolyte salt source to increase the concentration of the liquid electrolyte injected inside the electrochemical device, the present applicant confirmed that a specific metal salt, specifically, a metal salt containing a sulfonyl group (sulfonyl group-containing crystalline metal salt) imparts high flame retardant to the porous substrate, and electrochemical properties are also greatly improved together with securing flame retardancy as such. For commercializing medium and large electrochemical devices, most of all, safety to prevent explosion or ignition should be predetermined. The present applicant confirmed that the safety is firmly secured by the metal salt containing a sulfonyl group (sulfonyl group-containing crystalline metal salt). The present applicant confirmed that the safety (flame retardancy) is implemented also by a high-concentration sulfonyl group-containing crystalline metal salt which is acted as a salt source to the liquid electrolyte in the electrochemical device and then formed at a relatively high concentration inside the separator (porous substrate), and in the case in which the sulfonyl group-containing crystalline metal salt is fixed to the separator (porous substrate) by the different kind of material.

The composite separator according to an exemplary embodiment of the present invention based on the findings may include a porous substrate; and a crystalline metal salt containing a sulfonyl group (sulfonyl group-containing crystalline metal salt). Flame retardancy may be secured and also the electrochemical physical properties are not deteriorated or the electrochemical physical properties are rather enhanced, by the sulfonyl group-containing crystalline metal salt.

Without being necessarily limited to the interpretation, the sulfonyl group-containing crystalline metal salt which is fixed to the porous substrate by a different kind of material, or is positioned in or fixed itself to the porous substrate in a salt state (crystalline salt) without dissociating into ions forms a coordination structure by an interaction between the active cations of the liquid electrolyte injected to the electrochemical device and a sulfonyl group of a solvent molecule and anions, to inhibit flammable solvent molecules from becoming a free solvent while having very high volatility, thereby imparting flame retardancy to the porous substrate. In particular, when the solvent of the liquid electrolyte includes a carbonate-based solvent, an ether-based solvent, or a carbonate-based solvent and an ether-based solvent, aggregate clustering of two or three or more active metal cations (active ions) and a sulfonyl group with a solvent molecule are accelerated, so that it may be easier to form the coordination structure.

Furthermore, flame retardancy is firmly secured by the sulfonyl group-containing crystalline metal salt and also the conduction performance through the porous substrate may be greatly improved. Without being necessarily limited to the interpretation, a high-concentration ion cluster is locally formed by the crystalline metal salt provided by the composite separator, so that transfer between ions near the inside of the cluster may occur smoothly by a Grotthuss mechanism to improve a transfer coefficient of metal ions. Furthermore, metal ion transfer is accelerated by a synergy effect with the vehicle mechanism by a solvent molecule to improve the ionic conductivity of metal ions.

It is preferred that the sulfonyl group-containing crystalline metal salt is positioned substantially uniformly in the surface area of the porous substrate. Thus, as an advantageous example considering flame retardancy, the sulfonyl group-containing metal salt may be positioned substantially uniformly on the surface (outermost surface) of the porous substrate or may be positioned substantially uniformly in the surface area from 0.05 to 0.3 $t_{pm}$ in the thickness direction of the porous substrate on one surface, wherein $t_{pm}$ is the total thickness of the porous substrate.

As a substantial example, when the porous substrate includes a porous film which is not provided with a separate coating layer, the sulfonyl group-containing crystalline metal salt may be positioned substantially uniformly on the surface of the porous film.

As a substantial example, when the porous substrate includes a porous film and a porous coating layer positioned on at least one side surface of the porous film, the sulfonyl group-containing crystalline metal salt is positioned substantially uniformly on the surface (outermost surface) of the porous coating layer, or the sulfonyl group-containing crystalline metal salt is positioned substantially uniformly on the surface (outermost surface) of the porous coating layer and in a part of the area inside the porous coating layer or may be positioned substantially uniformly on the surface (outermost surface) of the porous coating layer, in the inside (internal pore surface) of the porous coating layer, and in an area in contact with the pores of the porous coating layer on the boundary surface between the porous film and the porous coating layer. Here, a part of the area inside the porous coating layer in which the sulfonyl group-containing crystalline metal salt is positioned is similar to or the same as those described above.

However, such an example is only an advantageous example to stably impart flame retardancy to the porous substrate, and the present invention may not be limited by the specific position of the sulfonyl group-containing crystalline metal salt, and furthermore, even by a subject to which flame retardancy is imparted by the sulfonyl group-containing crystalline metal salt, of course. As described later with respect to a coating solution, the sulfonyl group-containing crystalline metal salt is positioned in each of all constituent members in direct contact with the liquid electrolyte in the electrochemical device, thereby imparting flame retardancy to the corresponding constituent member.

In the composite separator according to an exemplary embodiment, the sulfonyl group-containing crystalline metal salt may have a molecular weight (g/mol) of 1000 or less, specifically 500 or less, and more specifically 400 or less, and substantially, may have a molecular weight of 10 or more, 20 or more, or 30 or more. In addition, the sulfonyl group-containing crystalline metal salt may have the number of anions per molecule of the metal salt of 1 to 4, specifically 1 to 3, and more specifically 1 or 2.

In the composite separator according to an exemplary embodiment, the sulfonyl group-containing crystalline metal salt may be any one or two or more selected from compounds satisfying the following Chemical Formulae 1 to 4. When the composite separator includes the compounds satisfying the following Chemical Formulae 1 to 4, flame retardancy is secured, and also wettability for the liquid electrolyte may be improved and a smoother ion flow may be caused.

(Chemical Formula 1)

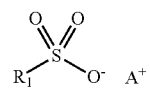

wherein $A^+$ is a monovalent cation, and $R_1$ is F, $CFH_2$, $CF_2H$, or $C_nF_{2n+}$, wherein n is a natural number of 1 or more, specifically a natural number of 1 to 5, and more specifically a natural number of 1 to 3, (Chemical Formula 2)

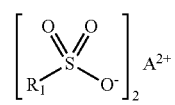

wherein $A^{2+}$ is a divalent cation, and $R_1$ is F, $CFH_2$, $CF_2H$, or $C_nF_{2n+}$, wherein n is a natural number of 1 or more, specifically a natural number of 1 to 5, and more specifically a natural number of 1 to 3, (Chemical Formula 3)

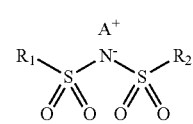

wherein $A^+$ is a monovalent cation, and $R_1$ and $R_2$ are independently of each other F, $CFH_2$, $CF_2H$, or $C_nF_{2n+}$, wherein n is a natural number of 1 or more, specifically a natural number of 1 to 5, and more specifically a natural number of 1 to 3, and

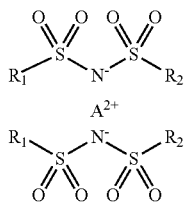

(Chemical Formula 4)

wherein $A^+$ is a divalent cation, and $R_1$ and $R_2$ are independently of each other F, $CFH_2$, $CF_2H$, or $C_nF_{2n+}$, wherein n is a natural number of 1 or more, specifically a natural number of 1 to 5, and more specifically a natural number of 1 to 3.

In Chemical Formulae 1 to 4, $A^+$ or $A^{2+}$ may be any monovalent metal ion or divalent metal ion which may serve as a counter part of a sulfonyl group-containing anion component. As a non-limiting example, the monovalent cation may be one or more metal ions selected from alkali metals, and as an example, may be a lithium ion or a sodium ions, and the divalent cation may be one or more metal ions selected from alkali earth metals and post transition metals, and as an example, may be a zinc ion, and the like, but the present invention is not necessarily limited thereto. Additionally or independently, in Chemical Formulae 1 to 4, $R_1$ and $R_2$ may be independently of each other selected from F, $CF_3$, and $CF_2CF_3$. As a substantial example, the sulfonyl group-containing crystalline metal salt may be any one or two or more selected from lithium trifluoromethanesulfonate, lithium bis(fluorosulfonyl)imide, lithium bis(trifluoromethanesulfonyl)imide, lithium bis(perfluoroethanesulfonyl)imide, zinc trifluoromethanesulfonate, zinc di[bis (trifluoromethylsulfonyl)imide], and the like.

In Chemical Formulae 1 to 4, the monovalent cation or the divalent cation may be an active ion which is a metal ion participating in the electrochemical reaction of the electrochemical device, so that wettability is improved and also the conductivity of ions which pass through the composite separator and move between the two electrode areas is more significantly improved. Based on the lithium secondary battery which is an example of a representative electrochemical device, the sulfonyl group-containing crystalline metal salt may be one or more materials selected from the compounds satisfying Chemical Formulae 1 to 3, in which the monovalent cation may be a lithium ion.

In terms of stably implementing flame retardancy securing, and furthermore, improved wettability and/or ionic conductivity by the sulfonyl group-containing crystalline metal salt described above, the crystalline metal salt may be in a state of being fixed to the porous substrate by a different kind of material from the metal salt.

However, fixation by the metal salt may not be interpreted as being limited to the case of the sulfonyl group-containing crystalline metal salt. As described above, even in the case in which the composite separator serves as a metal source to the liquid electrolyte, the metal salt may be in a state of being fixed to the porous substrate by an external element (different kind of material) other than the porous substrate and the metal salt. However, considering the function as the salt source, fixation by the external element (different kind of material) is eliminated in a state in which the composite separator is in contact with the liquid electrolyte and the metal salt may be fixed to an external element (different kind of material) in which the metal salt is dissolved into the liquid electrolyte. Thus, the metal salt provided as a solute of the electrolyte in the composite separator, based on a non-contact state with the liquid electrolyte may be also in the state of being fixed to the porous substrate.

However, in the case of the sulfonyl group-containing crystalline metal salt, fixation of the metal salt should be interpreted as also including fixation in which fixation by the different kind of material is maintained (maintained in a state in which the metal salt may not be freely dissolved into the liquid electrolyte) even in a state of being in contact with the liquid electrolyte.

As a specific example, the metal salt (including a sulfonyl group-containing crystalline metal salt) may be in a state of being fixed by any one or more binding components selected from linear polymers and crosslinked polymers. When the binding component is a linear polymer or a crosslinked polymer, activity to Brownian motion is suppressed so that the metal salt firmly maintains a designed concentration in the composite separator, thereby stably securing the physical properties to be desired for a long time.

As a substantial example, the linear polymer may be any one or a mixture of two or more selected from poly(vinylidene fluoride) (PVdF), poly(vinylidene fluoride)-co-hexafluoropropylene (PVdF-co-HFP), polymethylmethacrylate (PMMA), polystyrene (PS), polyvinyl acetate (PVA), polyacrylonitrile (PAN), polyethylene oxide (PEO), polyacetylene, polythiophene, polypyrrole, (poly(p-phenylene)), poly(phenylenevinylene)), (poly(phenylene sulfide)), polyaniline, poly(3,4-ethylenedioxythiophene) (PEDOT), and the like, but is not limited thereto.

When the binding component is the crosslinked polymer, the physical properties to be desired may be more uniformly imparted to the desired area of the porous substrate, which is thus advantageous. Specifically, when the binding component is the crosslinked polymer, the metal salt may be fixed by curing a curing component having curability, which is converted into the binding component by curing, in a state of being mixed with the metal salt (in the presence of the metal salt).

As an example, the curing component may be one or two or more selected from the group consisting of monomers, oligomers, and prepolymers having curability. Here, curing of curability may be thermal curing, chemical curing, and/or photocuring, but is not limited thereto. Substantially, the curing component may be a monomer having curability (crosslinkable monomer), and the binding component may be a crosslinked polymer. More substantially, the metal salt may be fixed by crosslinking a crosslinkable monomer by an initiator in a state in which the metal salt and the crosslinkable monomer are mixed.

As a specific example, the crosslinkable monomer which is a curing component may be a monomer having two or more functional groups, a mixed monomer in which a monomer having two or more functional groups and a monomer having one functional group are mixed, and the like, but the present invention may not be limited by the number of functional groups of the crosslinkable monomer, of course. As a substantial example, the crosslinkable monomer which forms a crosslinked polymer by crosslinking may be any one or two or more crosslinkable monomers selected from acrylate-based monomers, acrylic acid-based monomers, sulfonic acid-based monomers, phosphoric acid-based monomers, perfluorinated monomers, acrylonitrile-based monomers, and the like, but is not limited thereto. A substantial example of the monomer having two or more functional groups may include any one, a mixture of two or more, or the like selected from polyethylene glycol diacrylate, polyethylene glycol dimethacrylate, triethylene glycol diacrylate, triethylene glycol dimethacrylate, trimethylolpropane ethoxylate triacrylate, trimethylolpropane ethoxylate trimethacrylate, bisphenol A ethoxylate diacrylate, bisphenol A ethoxylate dimethacrylate, and the like, but is not limited thereto. A substantial example of the monomer having one functional group may include any one, a mixture of two or more, or the like selected from methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride, vinyl fluoride, and the like, but is not limited thereto. A more substantial example may include a mixture of any one or more selected from trimethylolpropane ethoxylate, triacrylate alone, or trimethylolpropane ethoxylate triacrylate, and other monomers having two or more functional groups and the monomer having one functional group, but is not limited thereto.

The composite separator according to an exemplary embodiment may include the crystalline metal salt in the form of a coating layer.

Specifically, the composite separator may include a porous substrate; and a coating layer including the crystalline metal salt described above, positioned on at least one side surface of the porous substrate. More specifically, the composite separator may include a porous substrate; and a coating layer including the crystalline metal salt described above and one or more polymer components selected from linear polymers and crosslinked polymers, positioned on at least one side surface of the porous substrate. The coating layer may correspond to the case of forming a continuum in which the binding components fixing the metal salt are continuously connected, but the present invention may not be necessarily interpreted as being limited to this case. Regardless of whether the binding components form a continuum, in the manufacturing method, by performing a process of uniformly coating a solution (coating solution) including a metal salt and a binding component or a curing component on the desired surface area of the porous substrate, and then removing at least a solvent by volatilization and if necessarily, performing curing, when the metal salt and the binding component coexist in the desired area of the porous substrate, it may be interpreted that the metal salt is provided in the form of a coating layer. Here, it is preferred that the solvent to be used is one or more solvents selected from C1-C3 low alcohol-based solvents, ketone-based solvents, and carbonate-based solvents, in which the metal salt described above with the linear polymer and the crosslinked polymer is easily dissolved and which is completely volatilized and removed by simple drying. An example of the C1-C3 low alcohol-based solvent may include methanol, ethanol, isopropyl alcohol, and the like, an example of the ketone-based solvent may include acetone, methyl ethyl ketone, methyl isobutyl ketone, and the like, and an example of the carbonate-based solvent may include ethylene carbonate, propylene carbonate, fluoroethylene carbonate, dimethyl carbonate, diethyl carbonate, and the like. Here, the coating solution may include only the solvent described above, except one or two or more curing components selected from the group consisting of monomers, oligomers, and prepolymers having curability, which is converted into the binding component by curing, and thus, after drying to remove the solvent by volatilization, a solid coating film may be prepared.

The coating layer may be positioned on at least one side surface (electrode side which is a positive electrode side or a negative electrode side) of the porous substrate, each of two surfaces facing each other of the porous substrate, or the entire surface of the porous substrate, but is not limited thereto, and the case in which the coating layer is selectively positioned in a preset area on one side surface of the porous substrate is not excluded from the present invention.

Specifically, the coating layer may be positioned on the surface (outermost surface) of the porous substrate or may be positioned on the outermost surface of the porous substrate and on the pore surface of open pores of the porous substrate. More specifically, the coating layer may be positioned on the pore surface present in an area (surface area) from 0.05 to 0.3 $t_{pm}$ in the thickness direction of the porous substrate on one surface (outermost surface), wherein $t_{pm}$ is the total thickness of the porous substrate. When the coating layer is positioned on the pore surface also, the size of some pores may be decreased in the surface area, but the inherent pore structure of the porous substrate is substantially maintained as it is without closure (damage) of the pores. It is preferred that the coating layer includes a crosslinked polymer also in terms of maintaining the inherent pore structure of the porous substrate. This is because when a solution including the crosslinkable monomer and the metal salt is used to form the coating layer, an extremely thin and uniform coating layer may be formed on the outermost surface or the outermost surface and the pore surface of the porous substrate, and thus, damage of the pore structure of the porous substrate is substantially prevented.

As a substantial example, when the porous substrate includes a porous film which is not provided with a separate coating layer, the coating layer may be directly bound and positioned on the surface of the porous film. In the method, direct binding may be phase transformation (solidification) of the binding component and/or curing of the curing component by removing the solvent by volatilization after applying a solution (coating solution) including the metal salt and the binding component and/or the curing component.

As a substantial example, when the porous substrate includes a porous film and a porous coating layer positioned on at least one side surface of the porous film, the coating layer (metal salt-containing coating layer) may be directly bound to and positioned on the surface (outermost surface) of the porous coating layer, may be directly bound to and positioned on the surface (outermost surface) of the porous coating layer and on the pore surface belonging to a part of the area (surface area) inside the porous coating layer, or may be directly bound to and positioned on the surface (outermost surface) of the porous coating layer, in the inside (internal pore surface) of the porous coating layer, and in an area in contact with the pores of the porous coating layer on the boundary surface between the porous film and the porous coating layer. Additionally or independently, the coating layer (metal salt-containing coating layer) may be positioned between the porous film and the porous coating layer. Here, a part of the area (surface area) inside the porous coating layer in which the coating layer is positioned is similar to or the same as that described above.

When the metal salt is provided in the form of a coating layer, the composite separator may include 5 to 70 parts by weight, 5 to 50 parts by weight, 5 to 40 parts by weight, 5 to 30 parts by weight, or 10 to 25 parts by weight of the different kind of material, specifically the binding component, and more specifically one or more polymers selected from linear polymers and crosslinked polymers, based on 100 parts by weight of the metal salt. The content of the different kind of material is a content which may stably fix the metal salt included in the composite separator.

When the metal salt is provided in the form of a coating layer, it is preferred that the content is 0.3 mg/cm$^2$ or more per unit area of the porous substrate so that the composite separator firmly shows flame retardancy even in the case in which the composite separator is directly contact with a flame. Specifically, the content of the metal salt may be 0.3 to 5.0 mg/cm$^2$, 0.3 to 4.0 mg/cm$^2$, 0.3 to 3.0 mg/cm$^2$, 0.3 to 2.5 mg/cm$^2$, 0.3 to 2.0 mg/cm$^2$, 0.4 to 1.5 mg/cm$^2$, 0.5 to 1.4 mg/cm$^2$, or 0.5 to 1.2 mg/cm$^2$.

Additionally or independently, the content of the projected image metal salt which is a mass of the metal salt per unit area based on the projection image of the porous substrate may be 0.3 to 6.0 mg/cm$^2$, specifically 0.3 to 5.0 mg/cm$^2$, 0.3 to 4.0 mg/cm$^2$, specifically 0.5 to 3.0 mg/cm$^2$, 0.4 to 2.0 mg/cm$^2$, 0.5 to 1.5 mg/cm$^2$, 0.7 to 1.4 mg/cm$^2$, 0.8 to 1.3 mg/cm$^2$, or 0.8 to 1.2 mg/cm$^2$, so that flame retardancy is secured and also deterioration of the characteristics of the electrochemical cell by introduction of the metal salt in the form of a coating layer is prevented.

Here, in the content of the projected image metal salt, the unit area may be a unit area of the projection image in a direction looking down the largest surface of the porous substrate, and the mass of the metal salt per unit area may be a total mass of the metal salt positioned in a porous substrate area corresponding to the unit area of the projection image. As an example, when two facing surfaces of the porous substrate are a first surface and a second surface, respectively, and the mass of the metal salt per unit area of the first surface is A and the mass of the metal salt per unit area of the second surface is B, the content of the metal salt is A or B and the content of the projected image metal salt is A+B. Here, the content of the metal salt on each of different surfaces from each other may satisfy each of the ranges described above, of course.

When the metal salt, advantageously a sulfonyl group-containing crystalline metal salt is introduced in the form of a coating layer, the composite separator provided in the electrochemical device may stably show flame retardancy even under a harsh environment and stably show flame retardancy without change in physical properties during the desired life time of the electrochemical device. Even when one or more sulfonyl group-containing crystalline metal salts selected from the compounds satisfying Chemical Formulae 1 to 4 are introduced in the form of a coating layer, excellent wettability and/or improved metal ionic conductivity may be maintained during the desired life time of the electrochemical device substantially regardless of the use environment. Thus, considering the specific use of the electrochemical device and the important physical properties required in the corresponding use, it may be selectively determined whether the metal salt is fixed, of course.

As described above, the composite separator according to an exemplary embodiment of the present invention may include the metal salt (first metal salt) serving as the salt source to the electrolyte, and the composite separator according to another exemplary embodiment may include the sulfonyl group-containing crystalline metal salt (second metal salt) fixed to the porous substrate for securing firm and stable flame retardancy for a long time. Here, the present invention may not be interpreted as being limited to the case of the metal salt serving as the salt source or the sulfonyl group-containing crystalline metal salt in a fixed state. That is, the composite separator according to the present invention may include the porous substrate; and each of the metal salt (first metal salt) serving as the salt source and the sulfonyl group-containing crystalline metal salt (second metal salt) in the state of being fixed to the porous substrate.

As a similar example, a coating layer including a sulfonyl group-containing crystalline metal salt may be provided in the surface (or surface area) of the porous substrate to secure flame retardancy, and the first metal salt in a soluble form when coming into contact with a liquid medium may be provided in the porous substrate provided with a metal salt-containing coating layer to serve as the salt source. A person skilled in the electrochemical device field or the separator field may easily derive various variations as an exemplary embodiment so that both the action of the salt source and the physical properties of flame retardancy are implemented, based on the above descriptions related to the action of the salt source, flame retardancy securing by the sulfonyl group-containing crystalline metal salt fixed and positioned in the same form as the coating layer, or the like, and this is an easy modification based on the above descriptions in the composite separator and is included in the scope of the present invention.

The flame retardancy secured by the metal salt is different from thermal stability improvement by introducing a conventionally developed flame retardant material (as an example, introducing an inorganic coating layer) or flame retardancy secured by the specific material of the porous substrate. Without being necessarily limited to the interpretation, the flame retardancy implemented in the composite separator according to an exemplary embodiment of the present invention may be flame retardancy secured by a change of state of a solvent molecule of the liquid electrolyte by the sulfonyl group-containing crystalline metal salt (as an example, forming a coordination structure with a metal salt) and/or free solvent suppression by high concentration of the liquid electrolyte in contact with the separator. Here, the high concentration of the liquid electrolyte in contact with the separator may refer to high concentration occurring by forming a concentration gradient of the electrolyte salt between the separator and the electrode by the metal salt supplied in the separator, of course. Thus, the metal salt which may show flame retardancy may not be interpreted as being limited to the sulfonyl group-containing crystalline metal salt. This is because as the metal salt is supplied from the separator to the liquid electrolyte and a high-concentration electrolyte gradient is formed in the separator side, a free solvent is suppressed, and even a metal salt which does not contain a sulfonyl group may show flame retardancy. However, when a high concentration of the electrolyte gradient is formed by the sulfonyl group-containing crystalline metal salt rather than other metal salts, an ionic conductivity by the separator is greatly improved, thereby improving capacity retention, high-rate characteristics, high temperature characteristics, and/or cycle characteristics, and the like. Thus, even when the metal salt included in the composite separator is provided in a soluble form in the liquid medium and served as the salt source to the electrolyte inside the electrochemical device, it is advantageous that the metal salt included in the composite separator is the sulfonyl group-containing crystalline metal salt, but the present invention is not necessarily limited thereto.

Thus, the present invention provides a flame retardant separator based on the specific technical idea of the present invention.

The flame retardant separator (flame retardant separator I) according to the present invention has flame retardancy not to cause a flame in the following flame retardancy test which is carried out at the point when a droplet does not fall from the separator to the bottom for 1 minute in the case in which the separator is impregnated with the following reference electrolyte for 1 minute and then recovered, and immediately after the recovery, the separator is positioned so that a gravity direction and an in-plane direction of the separator are parallel to each other:

reference electrolyte: a mixed solvent of ethylene carbonate and dimethyl carbonate at a volume ratio of 1:1, a lithium salt of $LiPF_6$, a concentration of $LiPF_6$ of 1 M, and a temperature of 25° C. 5° C., flame retardancy test: length of flame in the air=5 to 10 cm, temperature of flame tip=1000 to 1500° C., length of flame area which is not in contact with the separator when applying a flame to the separator=50 to 80% of the length of flame in the air, and flame movement speed in a state of being in contact with the separator=1 to 5 cm/sec.

Here, a flame movement may be a movement to allow 30 to 90% of a diameter along the diameter passing through the center of the separator (maximum diameter) to come into contact with a flame, and in the flame movement, an area which was previously in contact with a flame may be in contact once or twice repeatedly, but the present invention is not necessarily limited to the flame movement and contact.

Here, not causing flame from the separator means that other flame does not occur other than the flame applied from the outside for the flame retardancy test, and there is no flame in the separator simultaneously with the removal of flame applied from the outside.

Here, the flame retardancy test may be performed by placing the separator on the bottom of the flame retardant container at the time of test, and the flame may be regarded as being removed when the shortest separation distance between flames applied from the separator and the outside is 0.5 m or more, 1 cm or more, 5 cm or more, substantially 10 cm or more, but the present invention is not necessarily limited thereto.

The flame retardancy shown in the flame retardancy test using the reference electrolyte may be flame retardancy of the composite separator described above, specifically the composite separator including the sulfonyl group-containing crystalline metal salt. The flame retardancy test using the reference electrolyte described above may be in a state before, during, or after using the composite separator as the separator of the electrochemical device. As a substantial example, the flame retardancy test using the reference electrolyte described above may be in a state before using the composite separator as the separator of the electrochemical device, that is, in a state in which there is no history of previous contact of the composite separator with the liquid electrolyte. As another substantial example, in the flame retardancy test using the reference electrolyte described above, the separator provided (used) in the electrochemical device may be separated and recovered.

Independently, when the separator is previously provided in the electrochemical device using any liquid electrolyte, the flame retardant separator (flame retardant separator II) according to the present invention has flame retardancy not to cause a flame from the separator in testing the separator obtained by the following steps by the following flame retardancy test:

Steps: 1) unsealing the electrochemical device to open at least one end portion and cutting a connection between a tab provided for electrical connection to the outside and an electrode composite of positive electrode-separator-negative electrode to recover the electrode composite; 2) separating and recovering only the separator from the recovered electrode composite; 3) immediately after recovering the separator, positioning the separator so that the direction of gravity and the in-plane direction of the separator are parallel and performing the following flame retardancy test at the time point (initial point) when a droplet does not fall from the separator to the bottom for 1 minute, Flame retardancy test: length of flame in the air=5 to 10 cm, temperature of flame tip=1000 to 1500° C., length of flame area which is not in contact with the separator when applying a flame to the separator=50 to 80% of the length of flame in the air, and flame movement speed in a state of being in contact with the separator=1 to 5 cm/sec. Here, a flame movement may be a movement to allow 30 to 90% of a diameter along the diameter passing through the center of the separator (maximum diameter) to come into contact with a flame, and in the flame movement, an area which was previously in contact with a flame may be in contact once or twice repeatedly, but the present invention is not necessarily limited to the flame movement and contact.

The flame retardant separator (I or II) described above may include the sulfonyl group-containing crystalline metal salt described above, and may show flame retardancy by the sulfonyl group-containing crystalline metal salt described above. Thus, the flame retardant separator described above includes all of the above descriptions related to the sulfonyl group-containing crystalline metal salt in the composite separator.

Otherwise, the flame retardant separator (I or II) described above may show flame retardancy by the concentration gradient of the electrolyte salt formed by the metal salt provided in the liquid electrolyte by the composite separator, specifically, suppression of free solvent by high concentration of the liquid electrolyte in adjacent to the separator. Thus, the flame retardant separator described above includes all of the above descriptions related to the configuration serving as the salt source in the composite separator.

Otherwise, the flame retardant separator (I or II) described above may show flame retardancy by both the sulfonyl group-containing crystalline metal salt (second metal salt) fixed to and positioned in the porous substrate and the metal salt (first metal salt) provided in a soluble form when coming into contact with a liquid medium including a solvent in the porous substrate.

The composite separator or the flame retardant separator described above may be a separator including no liquid component, that is, a dry separator. The dry separator may refer to a separator having a mass reduction rate of $(W_0-W_{1h})/W_0 \times 100(\%)$ of 1% or less, specifically 0.5% or less, or reaching substantially 0%, wherein the mass of the composite separator immediately after manufacture is $W_0$ and the mass of the composite separator after allowing the separator immediately after manufacture to stand in the atmosphere at 25° C. for 1 hour is $W_{1h}$. Here, substantially 0% means that there is no change in mass within the measurement error range of equipment for measuring mass, considering the measurement error.

The present invention includes an electrochemical device including the composite separator described above.

The present invention includes an electrochemical device including the flame retardant separator (I or II) described above.

Independently, the present invention includes an electrochemical device including a positive electrode; a negative electrode; a separator interposed between the positive electrode and the negative electrode; and an electrolyte, wherein when components in an electrode which is the positive electrode or the negative electrode and in the separator are analyzed, the concentration of the metal salt-derived element component which is element components derived from the metal salt is different.

Here, a phenomenon in which a higher concentration of the metal salt-derived element component is shown in the separator than in the electrode may be implemented by the metal salt fixed to and positioned in the separator (corresponding to the composite separator described above), specifically the composite separator provided in the electrochemical device. The metal salt according to an advantageous example may be the sulfonyl group-containing crystalline metal salt described above, and a concentration difference of the metal salt-derived element components may be due to the sulfonyl group-containing crystalline metal salt fixed to and positioned in the porous substrate.

Independently, the present invention includes an electrochemical device including a positive electrode; a negative electrode; a separator interposed between the positive electrode and the negative electrode; and an electrolyte including a metal salt, wherein when components in an electrode which is the positive electrode or the negative electrode and in the separator are analyzed, the concentration of the metal salt-derived element component which is element components derived from the metal salt is different. Substantially, the concentration of the metal salt-derived element component in the separator may be higher than the concentration of the metal salt-derived element component in the electrode.

According to an example, a phenomenon in which the concentration of the metal salt-derived element component is shown to be higher in the separator than in the electrode may be implemented when the metal salt dissolved in the electrolyte is resulted from the separator. Specifically, the phenomenon in which the concentration of the metal salt-derived element component is shown to be higher in the separator than in the electrode may be implemented when the separator includes a metal salt which may be dissolved (in a soluble form) in an electrolyte upon contact with the electrolyte, so that the electrolyte includes a metal salt derived from the separator.

When the separator includes a metal salt in a soluble form in the electrolyte, even after the composite separator comes into contact with a liquid medium including a liquid electrolyte or a solvent which is injected in the manufacturing process to provide the metal salt as a solute (electrolyte salt), the concentration of the metal salt in the porous substrate may be maintained for a long time in a state of being relatively high as compared with a positive electrode and a negative electrode. Depending on a concentration gradient formed by a separator-derived metal salt, electrolyte components in the separator, the positive electrode, and the negative electrode have different surface tensions from each other, and in a battery having no separate external force such as convention force, a concentration of the separator-derived metal salt may be maintained for a long time in a state of being relatively high as compared with the positive electrode and the negative electrode. By the concentration gradient as such, the concentration of the metal salt-derived element component may be shown to be higher in the separator than in the electrode.

Furthermore, when the metal salt is a metal salt containing a sulfonyl group, the surface wetting properties may be greatly improved by an interaction between the sulfonyl group and active metal ion, and a solvent in the electrolyte. Thus, when the metal salt is a metal salt containing a sulfonyl group, a difference in concentration between the metal salt-derived element component on the separator surface and the metal salt-derived element component on the electrode surface may be increased.

As described above, even in the case in which the separator includes the metal salt (including a sulfonyl group-containing crystalline metal salt) in a soluble form in the electrolyte so that the electrolyte at a desired concentration is prepared inside the electrochemical device, there may be a significant difference in concentration between the metal salt-derived element components in the electrode and in the separator.

Here, the electrolyte, specifically, the liquid electrolyte may include one, two, three, or four or more metal salts as a solute, and the metal salt of the electrolyte (electrolyte salt, solute) may be formed of a metal salt derived from the separator (hereinafter, referred to as a third metal salt) or may include a metal salt derived from the separator (hereinafter, referred to as a third metal salt) and a metal salt which is not derived from the separator (metal salt included in the electrolyte injected from the outside in assembling an electrochemical device, hereinafter, referred to as a fourth metal salt).

As an example, the electrolyte may include the third metal salt alone. In this case, when the electrochemical device is assembled, a solvent including no electrolyte salt (if necessary, including a conventionally known additive component) may be introduced from the outside.

As another example, the electrolyte includes the third metal salt and the fourth metal salt, but the third metal salt and the fourth metal salt may be the same kind of metal salts. When the third metal salt and the fourth metal salt are the same kind of metal salts (as an example, metal salt A), the concentration of metal salt A in the electrolyte in the electrochemical device after the electrochemical device is assembled may be higher than the concentration of metal salt A in the electrolyte introduced when the electrochemical device is assembled.

As another example, the electrolyte includes the third metal salt and the fourth metal salt, but the third metal salt and the fourth metal salt may be different kinds of metal salts. When the third metal salt and the fourth metal salt are different kinds of metal salts, the concentration (sum of the concentration of the third and fourth metal salts) of the total metal salt (electrolyte salt) in the electrolyte in the electrochemical device after the electrochemical device is assembled may be higher than the concentration (concentration of the fourth metal salt) of the metal salt (electrolyte salt) in the electrolyte introduced when the electrochemical device is assembled, and together with this, in the electrolyte after the electrochemical device is assembled, a metal salt (electrolyte salt, solute) which is not injected to the electrolyte may be included.

Independently, the present invention includes an electrochemical device including a positive electrode; a negative electrode; a separator interposed between the positive electrode and the negative electrode; and an electrolyte including a metal salt, wherein when components in an electrode which is the positive electrode or the negative electrode and in the separator are analyzed, the concentration of the metal salt-derived element component which is an element component derived from a metal salt is different and the concentration of the metal salt-derived element component in the electrode is higher than the concentration of the metal salt-derived element component in the separator.

The metal salt dissolved in the electrolyte is resulted from the electrode (positive electrode or negative electrode), and the case in which a difference in concentration of the metal salt-derived element component between electrode surfaces in the electrode occurs will be described in more detail. According to an example, a phenomenon in which the concentration of the metal salt-derived element component is shown to be higher in the electrode than in the separator may be implemented when the metal salt dissolved in the electrolyte is resulted from the electrode. Specifically, the phenomenon in which the concentration of the metal salt-derived element component is shown to be higher in the electrode than in the separator may be implemented when the electrode includes a metal salt which may be dissolved (in a soluble form) in an electrolyte upon contact with the electrolyte, so that the electrolyte includes a metal salt derived from the electrode.

In this case, the porous substrate in the composite separator described above may correspond to an electrode active material layer (negative electrode active material layer or positive electrode active material layer), and the surface or surface area of the electrode active material layer may correspond to the surface or surface area of the porous substrate. Thus, the electrochemical device having the concentration of the metal salt-derived element component in the electrode higher than the concentration of the metal salt-derived element component in the separator includes all of the above descriptions for the composite separator, by replacing the porous substrate with the electrode active material layer in the composite separator described above.

As a specific example, the electrode may include a metal salt in a soluble form in a liquid medium including a solvent or in a fixed form. That is, the metal salt may be in a state of being adsorbed and/or fixed to the electrode active material layer. Substantially, the metal salt which is positioned in a part of or the entire area of the electrode active material layer (negative electrode active material layer and/or positive electrode active material layer) may be included.

A part of the area of the electrode active material layer may refer to a surface area of the electrode active material layer, and the surface area of the electrode active material layer may refer to an area from 0.05 to 0.3 $t_{pm}$ in a direction from a side surface in contact with the electrolyte to a current collector wherein $t_{pm}$ is the thickness of the electrode active material layer, but the present invention is not necessarily limited thereto.

When the metal salt is positioned in the entire area of the electrode active material layer, the metal salt may be positioned in a pore surface area by pores (substantially open pores) inside the electrode active material layer, on the area of the active material surface (negative electrode active material surface or positive electrode active material layer) of the particle phase of the electrode active material layer, or both the pore surface area and the area of the active material surface, but the present invention is not necessarily limited thereto.

In the manufacturing method, a coating solution described later is applied to the electrode active material layer to support or fix the metal salt on/to a part of or the entire area of the electrode active material layer. In contrast, in the manufacturing method, the electrode active material particles are coated with the metal salt and then the electrode active material coated with the metal salt is used to prepare the electrode active material layer, thereby supporting the metal salt on the entire area of the electrode active material layer. In contrast, the metal salt is introduced to an electrode slurry including an electrode active material, a binder, and if necessary, a conductive material, and an electrode slurry including the metal salt is applied to prepare an electrode active material layer, thereby supporting the metal salt on the entire area of the electrode active material layer.

Experimentally, the concentration of the metal salt-derived element component in the electrode and the separator may be measured by the following analysis method, according to the following step (II) and/or step (III). The following step (II) and/or step (III) is step(s) to exclude an effect of a charge or discharge state or a state of the electrochemical device immediately before use:

Step (II): 1) unsealing the electrochemical device to open at least one end portion and cutting a connection between a tab provided for electrical connection to the outside and an electrode composite of positive electrode-separator-negative electrode to recover the electrode composite; curing the recovered electrode composite at 60° C. for 24 hours or more using an epoxy resin for molding to recover the electrode composite molded in an epoxy resin; and analyzing a sample obtained by cutting the molded electrode composite into a single-sided specimen of 20 um or less using an ion beam, by neutron depth distribution measurement (neutron depth profiling) to calculate a concentration gradient for an active metal ion of an electrode composite section, Step (III): 1) unsealing the electrochemical device to open at least one end portion and cutting a connection between a tab provided for electrical connection to the outside and an electrode composite of positive electrode-separator-negative electrode to recover the electrode composite; and 2) analyzing a solution obtained by immersing each of a separator, a positive electrode, and a negative electrode from the recovered electrode composite in anhydrous deuterated dimethyl sulfoxide for 24 hours, by the following method.

Analysis method: analysis by one or two or more methods selected from fluorine nuclear magnetic resonance spectroscopy (F-NMR), chlorine nuclear magnetic resonance spectroscopy (Cl-NMR), inductively coupled plasma mass spectrometry (ICP-MS), proton nuclear magnetic resonance spectroscopy (H-NMR), and X-ray photoelectron spectroscopy (XPS).

In analysis of components in the separator, the positive electrode, and the negative electrode by an analysis method, the analysis conditions are maintained identically of course, and in addition to the analysis method listed, any analysis method which may be used in the elemental analysis of a surface may be performed, and the present invention is not limited to the specific kind of analysis method.

In addition, in analysis using an analysis method, measurement is repeated 5 times or more, specifically 10 times or more for each sample, and an average value thereof may be taken.

In addition, when a difference in concentrations between the metal salt-derived element component in the separator and the metal salt-derived element component in the electrode is equivalent to or more than an error range previously known (previously determined) in the corresponding analysis method and analysis device, the difference may be interpreted as being significant, and when the difference is significant, it may be determined that the concentrations of the metal salt-derived element components in the separator and in the electrode are different from each other.

Specifically, the concentrations in the separator, the positive electrode, and the negative electrode may be determined by the following method.

Each concentration and ratio of the metal salt may be determined by F-NMR or Cl-NMR analysis of a liquid sample in which the electrolyte included in the separator, the positive electrode, and the negative electrode is dissolved and diluted. In addition, if necessary, the ratio of the solvent molecule and the content of the additive may be determined by H-NMR analysis.

In addition, the electrolyte determined by the analysis is directly prepared, and the analysis is performed again, thereby further including an inspection step of analysis.

Experimentally, a step of directly confirming that concentrations of a lithium salt in the separator, the positive electrode, and the negative electrode are different, by analysis, may be further included.

The metal salt-derived element component may be element(s) which is(are) not present in the porous substrate of the electrode (specifically, electrode active material layer) and the separator, among the elements forming the metal salt (electrolyte salt) dissolved in the electrolyte of the electrochemical device. In other words, the metal salt-derived element component may be an element which may be present only from the metal salt dissolved in the electrolyte, considering the specific materials of the separator, the positive electrode, and the negative electrode. Here, when two or more different metal salts (electrolyte salts) are dissolved in the electrolyte, the metal salt-derived element component is defined for each metal salt (electrolyte salt), and elemental analysis by the analysis method may be performed for each metal salt (electrolyte salt), of course. As a substantial example, when the metal salt is a sulfonyl group-containing crystalline metal salt, the metal salt-derived element component may be a sulfur component. When two or more different metal salts (electrolyte salts) are dissolved in the electrolyte, the concentrations of the metal salt-derived element components in the separator surface and in the electrode surface have only to be different from each other.

However, the present invention may not be limited to the metal salt-derived element component, and when the metal salt may not be traced by the metal salt-derived element component, and as an example, all elements contained in the metal salt are also present in the electrode or the porous substrate, the metal salt-derived element component may be replaced with a bonding state of the metal salt-derived element and/or the concentration or content of the metal salt-derived functional group (functional group present in the metal salt) and the like, of course, and this may correspond to an example of a simple change based on the present invention.

In terms of a manufacturing method, the electrochemical device according to the present invention includes a positive electrode; a negative electrode; a separator interposed between the positive electrode and the negative electrode; an electrolyte including a metal salt; and a case, wherein the concentration of the metal salt of the electrolyte (use electrolyte) sealed and invaginated in the case is higher than an injection concentration, the injection concentration is the concentration of the metal salt (electrolyte salt) of the electrolyte (injection electrolyte) injected into the case in the manufacture of the electrochemical device.

This is due to the fact that the injection electrolyte is in contact with the separator inside the case so that the metal salt included in the separator is dissolved in the injection electrolyte, and the injection electrolyte is converted into a use electrolyte. Experimentally, a configuration that the injection electrolyte is converted into the use electrolyte may be shown by different concentrations of the metal salt-derived element components in the electrode surface and in the separator surface described above.

In the electrochemical device according to an exemplary embodiment, a metal ion of the metal salt included in the separator may include an active ion, the active ion being a metal ion participating in the electrochemical reaction of the electrochemical device, but the present invention is not necessarily limited thereto.

In the electrochemical device according to an exemplary embodiment, a molar concentration of the salt of the active ion contained in the electrolyte, specifically, a molar concentration of the salt of the active ion contained in the use electrolyte may be at a level of 0.5 to 6.0 M, 0.5 to 5.0 M, 0.5 to 4.0 M, 0.5 to 3.0 M, 0.5 to 2.5 M, 0.5 to 1.2 M, 0.7 to 6.0 M, 0.8 to 6.0 M, 0.9 to 6.0 M, 1.0 to 6.0 M, 1.1 to 6.0 M, 1.2 to 6.0 M, 1.3 to 6.0 M, 1.4 to 6.0 M, 1.5 to 6.0 M, 1.6 to 6.0 M, 1.7 to 6.0 M, 1.8 to 6.0 M, 1.9 to 6.0 M, 2.0 to 6.0 M, 2.1 to 6.0 M, 2.2 to 6.0 M, 2.3 to 6.0 M, 2.4 to 6.0 M, 2.5 to 6.0 M, 0.7 to 5.0 M, 0.8 to 5.5 M, 0.9 to 5.0 M, 1.0 to 5.0 M, 1.1 to 5.0 M, 1.2 to 5.0 M, 1.3 to 5.0 M, 1.4 to 5.5 M, 1.5 to 5.0 M, 1.6 to 5.0 M, 1.7 to 5.0 M, 1.8 to 5.0 M, 1.9 to 5.0 M, 2.0 to 5.0 M, 2.1 to 5.0 M, 2.2 to 5.0 M, 2.3 to 5.0 M, 2.4 to 5.0 M, 2.5 to 5.0 M, 0.7 to 4.0 M, 0.8 to 4.0 M, 0.9 to 4.0 M, 1.0 to 4.0 M, 1.1 to 4.0 M, 1.2 to 4.0 M, 1.3 to 4.0 M, 1.4 to 4.0 M, 1.5 to 4.0 M, 0.7 to 1.2 M, 0.9 to 1.2 M, 0.8 to 2.5 M, 1.0 to 2.5 M, 1.2 to 2.5 M, 1.3 to 2.5 M, 1.4 to 2.5 M, 1.5 to 2.5 M, 1.6 to 2.5 M, 1.7 to 2.5 M, 1.8 to 2.5 M, 1.9 to 2.5 M, 1.5 to 2.2 M, 1.7 to 2.2 M, or 1.5 to 2.0 M, but is not limited thereto.

Here, as described above, a concentration gradient in which the concentration of the metal salt in the separator or the electrode in which the metal salt is supplied to the electrolyte is increased may be formed. As the active (metal) ion moves from a work electrode to another work electrode through the separator, the concentration of the salt of the active ion of the use electrolyte may be interpreted as a maximum concentration in a concentration gradient, that is, a maximum concentration of the concentration of the salt in the electrolyte included (supported) in the positive electrode, negative electrode, and the separator rather than as the concentration of the salt of an average active ion in the electrolyte.

In terms of the ionic conductivity of the metal ion, the electrochemical device according to the present invention includes a positive electrode; a negative electrode; a separator interposed between the positive electrode and the negative electrode; and an electrolyte, wherein the ionic conductivity of the separator in a state of being wet in the electrolyte may be 0.30 mS/cm or more, 0.32 mS/cm or more, 0.34 mS/cm or more, 0.36 mS/cm or more, 0.38 mS/cm or more, 0.40 mS/cm or more, 0.42 mS/cm or more, 0.44 mS/cm or more, 0.46 mS/cm or more, 0.48 mS/cm or more, 0.50 mS/cm or more, 0.52 mS/cm or more, 0.54 mS/cm or more, 0.56 mS/cm or more, 0.58 mS/cm or more, 0.60 mS/cm or more, 0.61 mS/cm or more, 0.62 mS/cm or more, 0.63 mS/cm or more, 0.64 mS/cm or more, 0.65 mS/cm or more, 0.66 mS/cm or more, 0.67 mS/cm or more, 0.68 mS/cm or more, 0.69 mS/cm or more, or 0.70 mS/cm or more, the active ion being a metal ion participating in an electrochemical reaction. Substantially, the ionic conductivity may be 2.00 mS/cm or less, but is not limited thereto.

In addition, together with the ionic conductivity described above, an ion migration coefficient of the active ion in the separator in a wetting state in the electrolyte may be 0.30 or more, 0.32 or more, 0.34 or more, 0.36 or more, 0.38 or more, 0.40 or more, 0.42 or more, 0.44 or more, 0.46 or more, 0.48 or more, 0.50 or more, 0.52 or more, 0.54 or more, 0.56 or more, 0.58 or more, 0.60 or more, 0.62 or more, 0.64 or more, 0.66 or more, or 0.68 or more. Substantially, the ion migration coefficient may be 1.50 or less, but is not limited thereto.

As described above regarding the composite separator, when the metal salt is a sulfonyl group-containing crystalline metal salt, in particular, one or more metal salts selected from the compounds satisfying Chemical Formulae 1 to 4, the ionic conductivity of the metal ion in the separator may be greatly improved.

It is noteworthy that the metal ionic conductivity improved by the metal salt is implemented even in a high-concentration electrolyte environment. Substantially, the ionic conductivity of the separator in a wetting state in the electrolyte, and furthermore, the ion migration coefficient of the active ion may be an ionic conductivity and an ion migration coefficient under a high-concentration electrolyte as the electrolyte. The high-concentration electrolyte may refer to a high-concentration liquid electrolyte having the concentration of the salt of the active ion dissolved in the electrolyte (when the salt of the active ion is two or more different from each other, a total concentration of the salt of the active ion) of 1 M or more. Specifically, the concentration of the salt of the active ion in the high-concentration electrolyte may be 1.0 M or more, 1.1 M or more, 1.2 M or more, 1.3 M or more, 1.4 M or more, 1.5 M or more, 1.6 M or more, 1.7 M or more, 1.8 M or more, 1.9 M or more, 2.0 M or more, 2.1 M or more, 2.2 M or more, 2.3 M or more, 2.4 M or more, or 2.5 M or more, and substantially, may have a concentration of 6 M or less. The salt of the active ion dissolved in the electrolyte may be a salt of the electrolyte in the electrochemical device field, and may be any material commonly used in the art. Here, the salt of the active ion dissolved in the electrolyte may include the metal salt described above regarding the composite separator, of course, but may be different from the metal salt described above regarding the composite separator. When there is the concentration gradient of the salt in the electrolyte inside the electrochemical device, the concentration of the salt of the active ion in the high-concentration electrolyte may be based on the maximum concentration value in the concentration gradient, and substantially, may be based on the highest concentration value obtained by measuring the concentration of the salt of the active ion in the positive electrode, the negative electrode, and the separator.

In each electrochemical device described above, the separator may be the same as or similar to the composite separator described above. Thus, the electrochemical device includes all of the above descriptions for the composite separator. The composite separator comes into contact with the electrolyte to supply the metal salt to the electrolyte, and the flame retardancy described above or the ion conduction properties described above may be shown by the metal salt remaining in the porous substrate. In contrast, the composite separator includes the metal salt fixed to the porous substrate, thereby showing the flame retardancy described above or the ion conduction properties described above.

The positive electrode, the negative electrode, the electrolyte, the case, and the like in each electrochemical device described above may be any positive electrode, negative electrode, electrolyte, case, and the like which are commonly used in the corresponding electrochemical device, considering the specific kind of electrochemical device. However, when the separator serves as the salt source to the electrolyte, the electrolyte may be an electrolyte which is more concentrated than the injected electrolyte, of course.

Taking a lithium secondary battery which is a representative electrochemical device as an example, the positive electrode may include a positive electrode current collector and a positive electrode active material layer positioned on at least one surface of the positive electrode current collector, the negative electrode may include a negative electrode current collector and a negative electrode active material layer positioned on at least one surface of the negative electrode current collector, the electrolyte may be a liquid electrolyte in which a lithium salt is dissolved in a solvent, and the case may be a pouch type case or a cylindrical or prismatic case.

Specifically, the positive electrode active material included in the positive electrode active material layer may be any material capable of reversible desorption/insertion of lithium ions, and may be any electrode material used in the positive electrode of a common lithium secondary battery. As an example, the positive electrode active material may be an oxide of a layered structure represented by $LiMO_2$ (M is one or two or more transition metals selected from Co and Ni); $LiMO_2$ (M is one or two or more transition metals selected from Co and Ni) substituted with one or two or more different kinds of elements selected from Mg, Al, Fe, Ni, Cr, Zr, Ce, Ti, B, and Mn or coated with an oxide of the different kind of element; $Li_xNi_\alpha Co_\beta M_\gamma O_2$ (x is a real number satisfying $0.8 \le x \le 1.5$, $\alpha$ is a real number satisfying $0.7 \le \alpha \le 0.9$, $\beta$ is a real number satisfying $0.05 \le \beta \le 0.35$, $\gamma$ is a real number satisfying $0.01 \le \gamma \le 0.1$, $\alpha+\beta+\gamma=1$, and M is one or more elements selected from the group consisting of Mg, Sr, Ti, Zr, V, Nb, Ta, Mo, W, B, Al, Fe, Cr, Mn, and Ce); $Li_xNi_aMn_bCo_cM_dO_2$ (x is a real number satisfying $0.9 \le x \le 1.1$, a is a real number satisfying $0.3 \le a \le 0.6$, b is a real number satisfying $0.3 \le b \le 0.4$, c is a real number satisfying $0.1 \le c \le 0.4$, d is a real number satisfying $0 \le d \le 0.4$, a+b+c+d=1, and M is one or more elements selected from the group consisting of Mg, Sr, Ti, Zr, V, Nb, Ta, Mo, W, B, Al, Fe, Cr, and Ce), or the like; an oxide having a spinel structure represented by $Li_aMn_{2-x}M_xO_4$ (M is one or two or more elements selected from Al, Co, Ni, Cr, Fe, Zn, Mg, B, and Ti, a is a real number satisfying $1 \le a \le 1.1$, and x is a real number satisfying $0 \le x \le 0.2$), $Li_4Mn_5O_{12}$, or the like; or a phosphate-based material having an olivine structure represented by $LiMPO_4$ (M is Fe, Co, or Mn) or the like, a mixture thereof, or the like, but is not limited thereto.

Specifically, the negative electrode active material of the negative electrode active material layer may be any material commonly used in the negative electrode of a lithium secondary battery, and the negative electrode active material may be any material capable of lithium intercalation. As an example, the negative electrode active material may be one or two or more materials selected from lithium (metal lithium), easily graphitized carbon, hardly graphitized carbon, graphite, silicon, an Sn alloy, an Si alloy, an Sn oxide, an Si oxide, a Ti oxide, an Ni oxide, a Fe oxide (FeO), a lithium-titanium oxide ($LiTiO_2$, $Li_4Ti_5O_{12}$), a mixture thereof, or a composite thereof, but is not limited thereto.

Each of the positive electrode active material layer and the negative electrode active material layer may further include an organic binder, and the binder may be any material commonly used in the electrode of the lithium secondary battery and may be any polymer capable of binding the active materials and binding the active material and the current collector without chemically reacting with the electrolyte. As a specific example, the positive electrode active material layer and negative electrode active material layer binders may be independently of each other, polyvinylidene fluoride, a polyvinylidene fluoride-hexafluoropropylene copolymer, a polyvinylidene fluoride-trichloroethylene copolymer, polymethyl methacrylate, polyacrylonitrile, polyvinylpyrrolidone, polyvinyl acetate, a polyethylene-vinyl acetate copolymer, polyethylene oxide, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethylcellulose, a styrene-butadiene copolymer, an acrylonitrile-styrene-butadiene copolymer, polyimide, polytetrafluoroethylene, or a mixture thereof, but the present invention is not limited to the materials of the binder, of course.

The positive electrode current collector or the negative electrode current collector may be, independently of each other, any positive electrode current collector or negative electrode current collector used in a common lithium secondary battery. Specifically, the positive electrode current collector or the negative electrode current collector may be any material which has excellent conductivity and is chemically stable during charge and discharge of a battery. Specifically, the positive electrode current collector and the negative electrode current collector may be a conductive material such as graphite, graphene, titanium, copper, platinum, aluminum, nickel, silver, gold, aluminum, or carbon nanotubes, but the present invention is not limited thereto.

If necessary, the positive electrode active material layer or the negative electrode active material layer may further include a conductive material, and the conductive material may be any conductive material commonly used in a lithium secondary battery for improving electrical conductivity of the active material layer. A specific example of the conductive material may include conductive carbon bodies such as carbon black, acetylene black, Ketjen Black™ channel black, furnace black, lamp black, thermal black, or a mixture thereof; conductive fibers such as carbon fiber or metal fiber; conductive nanostructures such as carbon nanotube or graphene; and the like, but is not limited thereto.

The electrolyte may be a liquid electrolyte and may be any non-aqueous electrolyte which conducts ions involved in charge and discharge of a battery well, in the common lithium secondary battery. As an example, the non-aqueous electrolyte may include a non-aqueous solvent and a lithium salt. The non-aqueous organic solvent may be carbonate, ester, ether, or ketone alone, a mixed solvent thereof, or the like. In particular, when a carbonate-based solvent and an ether-based solvent are used alone or used as a mixed solvent, it may be more advantageous for forming a coordination structure by an interaction between the active metal ion and a sulfonyl group. Specifically, the non-aqueous organic solvent may be ethylene carbonate, propylene carbonate, 1,2-butylene carbonate, 2,3-butylene carbonate, 1,2-pentylene carbonate, 2,3-pentylene carbonate, vinylene carbonate, vinyl ethylene carbonate, fluoroethylene carbonate, dimethyl carbonate, diethyl carbonate, di(2,2,2-trifluoroethyl) carbonate, dipropyl carbonate, dibutyl carbonate, ethyl methyl carbonate, 2,2,2-trifluoroethyl methyl carbonate, methyl propyl carbonate, ethyl propyl carbonate, 2,2,2-trifluoroethyl propyl carbonate, methyl isopropyl carbonate, methyl formate, ethyl formate, propyl formate, butyl formate, dimethyl ether, diethyl ether, dipropyl ether, methyl ethyl ether, methyl propyl ether, ethyl propyl ether, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, γ-thiobutyrolactone, γ-ethyl-γ-butyrolactone, β-methyl-γ-butyrolactone, γ-valerolactone, σ-valerolactone, γ-caprolactone, ε-caprolactone, β-propiolactone, tetrahydrofuran, 2-methyl tetrahydrofuran, 3-methyltetrahydrofuran, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, methyl ethylene phosphate, ethyl ethylene phosphate, dimethyl sulfone, ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl)sulfone, di(pentafluoroethyl) sulfone, trifluoromethyl pentafluoroethyl sulfone, trifluoromethyl nonafluorobutyl sulfone, pentafluoroethyl nonafluorobutyl sulfone, sulfolane, 3-methylsulfolane, 2-methylsulfolane, 3-ethylsulfolane, 2-ethylsulfolane, or a mixed solvent thereof, but is not limited thereto. As an example, the solvent of the electrolyte may be an ionic liquid.

A lithium salt may include the case in which the metal ion of the metal salt described above for the composite separator is a lithium ion, but is not limited thereto, and may be any lithium salt commonly used for conducting ions involved in the charge and discharge of a battery well.

Selectively, the electrolyte may further include a conventionally known additive, such as an additive for forming a solid electrolyte interface (SEI) film, such as halogen-substituted or unsubstituted, cyclic carbonate-based compound, nitrile-based compound, phosphate-based compound, borate-based compound, sulfate-based compound, sultone-based compound, and lithium salt-based compound, of course.

The electrochemical device may be a primary battery or a secondary battery capable of an electrochemical reaction. More specifically, the electrochemical device may be a lithium primary battery, a lithium secondary battery, a lithium-sulfur battery, a lithium-air battery, a sodium battery, an aluminum battery, a magnesium battery, a calcium battery, a zinc battery, a zinc-air battery, a sodium-air battery, an aluminum-air battery, a magnesium-air battery, a calcium-air battery, a super capacitor, a dye-sensitized solar battery, a fuel battery, a lead storage battery, a nickel cadmium battery, a nickel hydrogen storage battery, an alkaline battery, or the like, but is not limited thereto.

The present invention includes an electrochemical module having the electrochemical device described above as a unit cell, in which two or more cells are arranged and electrically connected to each other. The electrochemical module may have an arrangement and structure of a cell commonly used in the electrochemical device field, and may further include a common cooling member such as a cooling plate, of course.

The present invention includes an apparatus to which electric power is supplied by the electrochemical device or the electrochemical module described above. As an example, the apparatus may be an apparatus requiring medium and large electric power such as an electric vehicle or a hybrid vehicle, but is not limited thereto.

The present invention includes a coating solution coated on a constituent member of the electrochemical device in contact with an electrolyte. The coating solution of the present invention is a coating solution for coating the constituent member of the electrochemical device in direct contact with the electrolyte, except the electrolyte, and includes a metal salt.

The metal salt included in the coating solution is coated on the constituent member of the electrochemical device and may supply the metal salt to the electrolyte when being assembled (manufactured) into the electrochemical device, but the action of the metal salt in the coating solution may not be necessarily limited to the metal salt source to the electrolyte.

The metal salt in the coating solution according to the present invention may be the same as or similar to the metal salt described above for the composite separator, and thus, the coating solution includes all of the above descriptions related to the metal salt in the composite separator.

As an advantageous example, the coating solution may include a sulfonyl group-containing metal salt. By coating the constituent member of the electrochemical device with the coating solution including a sulfonyl group-containing metal salt, the coated constituent member may serve as a salt source to the electrolyte, or additionally or independently, the physical properties of flame retardancy may be imparted to the constituent member.

As a more advantageous example, the coating solution may include any one or two or more metal salts selected from the compounds satisfying Chemical Formulae 1 to 4 described above. By including the metal salt, together with the physical properties of flame retardancy or the action of the salt source or independently thereof, electrolyte wettability may be improved, or additionally or independently, the ionic conductivity of the active ion may be improved.

It is preferred that the solvent of the coating solution is one or more solvents selected from C1-C3 low alcohol-based solvents, ketone-based solvents, and carbonate-based solvents, in which the metal salt and if necessarily, a binding component used (as an example, a linear polymer and/or a crosslinked polymer) are easily dissolved and which is completely volatilized and removed by simple drying. An example of the C1-C3 low alcohol-based solvent may include methanol, ethanol, isopropyl alcohol, and the like, an example of the ketone-based solvent may include acetone, methyl ethyl ketone, methyl isobutyl ketone, and the like, and an example of the carbonate-based solvent may include ethylene carbonate, propylene carbonate, fluoroethylene carbonate, dimethyl carbonate, diethyl carbonate, and the like. Here, when the coating solution does not include a binding component, the coating solution may include only the solvent described above as a liquid raw material (based on at room temperature). In contrast, when the coating solution includes a binding component, the coating solution may include only the solvent described above as a liquid raw material (based on at room temperature), or include only a solvent and a liquid curing component which is one or two or more selected from the group consisting of monomer, oligomer, and prepolymer having curability and is converted into a binding component by curing.

A constituent member may be any member which is in direct contact with an electrolyte, specifically a liquid electrolyte, in a state of being assembled into an electrochemical device. As an example, the constituent member may be one or more selected from a positive electrode, a negative electrode, a separator, and a case. When the constituent member selected is two or more, each of them may be coated with the coating solution, of course.

Specifically, an example of the constituent member may include a positive electrode surface including a surface by pores (a positive electrode active material layer surface including a surface by pores), a negative electrode surface including a surface by pores (a negative electrode active material layer surface including a surface by pores), a separator surface including a surface by pores (or a surface area described above for the composite separator), an inner surface of a case, and the like, but is not limited thereto.

As described above, the coating solution may further include one or two or more curing components selected from the group consisting of monomer, oligomer, and prepolymer having curability, a linear polymer, or a mixture thereof, together with the metal salt described above, and when the coating solution includes the curing component, it may further include an additive including an initiator.

The curing component, the initiator, the linear polymer, and the like of the coating solution are the same as or similar to the binding component, the curing component converted into a crosslinked polymer, the initiator, and the like described above for the composite separator, and the coating solution includes all of the above descriptions in relation to the binding component and the curing component in the composite separator. Here, a weight ratio of metal salt: binding component may correspond to a weight ratio of metal salt:curing component in the coating solution.

The concentration of the metal salt in the coating solution may be at a level of 0.1 to 5 M, but is not necessarily limited thereto.

By applying the coating solution including the metal salt and the curing component on the constituent member and drying it, a coating layer including a crystalline metal salt in a state of being fixed to the constituent member may be formed.

The coating solution may further include inorganic particles, organic particles, organic and inorganic composite particles, or mixed particles thereof. Specifically, the coating solution may include a metal salt and a particle phase which is inorganic particles, organic particles, organic and inorganic composite particles, or mixed particles thereof. Here, the coating solution may further include the curing component described above, an organic binder, or the curing component and the organic binder.

The particle phase included in the coating solution is the same as or similar to the particle phase described above for the porous coating layer of the composite separator, and the organic binder included in the coating solution is the same as or similar to the binder described above for the porous coating layer of the composite separator. Thus, the coating solution includes all of the above description related to the particle phase which is the inorganic particles, the organic particles, the organic and inorganic composite particles, or mixed particles thereof, and a binder.

When the coating solution further includes the particle phase, the coating solution may include 10 to 1000 parts by weight, specifically 50 to 1000 parts by weight, and more specifically 100 to 500 parts by weight of the metal salt, based on 100 parts by weight of the particle phase. The content of the metal salt relative to the particle phase is in a content range in which the crystalline metal salt is uniformly distributed on the surface of the particle phase of the porous coating layer prepared using the coating solution, and furthermore, on the surface of the particle phase and in the binding component and/or the binder and which is advantageous for securing flame retardancy and/or improving ionic conductivity.

The coating solution may include 1 to 30 parts by weight, specifically 5 to 10 parts by weight of the binder, the curing component, or the binder and the curing component, based on 100 parts by weight, but is not limited thereto. However, porosity by an empty space between particles of the particle phase is maintained in the range described above, and the particle phases are stably fixed to the porous film by the binder and/or the curing component, which is thus advantageous. Here, the coating solution may include the particle phase at a level of 5 to 30 wt %, but is not limited thereto, and may include the particle phase at any wt % to show appropriate application suitability considering the specific application method of the coating solution.

By forming the coating layer on the porous film using the coating solution including the metal salt and the particle phase, the porous coating layer including a metal salt may be formed on the porous film. In this case, the coating solution may be a coating solution for preparing a separator. Here, the porous film is the same as or similar to the porous film described above for the composite separator, and thus, the coating solution includes all of the above descriptions related to the porous film in the composite separator.

The present invention includes a manufacturing method of an electrode (positive electrode or negative electrode) using the coating solution described above. Here, the coating solution may be a solution for coating an electrode (positive electrode or negative electrode) of an electrochemical device.

Specifically, the manufacturing method of an electrode according to the present invention includes a step of applying the coating solution described above on the electrode active material layer of the electrode. Here, the electrode active material layer may be a positive electrode active material layer or a negative electrode active material layer. The electrode active material layer may be prepared by a conventionally known common manufacturing method of applying a slurry including a particulate electrode active material, and a binder, and if necessary, further including a conductive material on a current collector, and drying and rolling it, of course.

Any application of the coating solution is performed, when an action as the metal salt source is prioritized, as long as the metal salt is positioned at or more than the content to increase the concentration of the liquid electrolyte from an injection concentration to a design concentration on the electrode active material layer. As a substantial example, the application may be performed so that the content of the metal salt which is a mass of the metal salt per unit area of the electrode active material layer is at a level of 0.1 to 5.0 mg/cm$^2$.

Additionally or independently, when flame retardancy or ionic conductivity improvement and the like are prioritized, the application may be performed so that the metal salt dissolved in the electrolyte and remaining in the electrode active material layer or the metal salt maintained in a state of being fixed to the electrode active material layer is at a level of 0.3 to 5.0 mg/cm$^2$, 0.3 to 4.0 mg/cm$^2$, 0.3 to 3.0 mg/cm$^2$, 0.3 to 2.5 mg/cm$^2$, 0.3 to 2.0 mg/cm$^2$, 0.4 to 1.5 mg/cm$^2$, 0.5 to 1.4 mg/cm$^2$, or 0.5 to 1.2 mg/cm$^2$, based on the content of the metal salt which is the mass of the metal salt per unit area of the electrode active material layer.

The application of the coating solution may be performed by one or more methods selected from spin coating, roll coating, spray coating, dip coating, flow coating, doctor blade, dispensing, ink jet printing, offset printing, stencil printing, screen printing, pad printing, gravure printing, reverse gravure printing, gravure offset printing, flexography printing, stencil printing, imprinting, xerography, slot die coating, bar coating, roll to roll coating, and the like, but is not limited thereto.

After the coating solution is applied, a step of applying energy to the coated product of the coating solution may be further performed. The applied energy may be thermal energy, light energy, or thermal and light energy, and the application of thermal and light energy may include sequential application or concurrent application.

The energy application may be application for more rapid volatilization removal (drying) of the solvent in the coated product, and/or when the coating solution includes a curing component, application for converting the curing component included in the coated product into a binding component. In the energy application for drying and energy application for conversion into a binding component, the kinds of heat energy, light energy, or heat and light energy may be different from each other, of course, and after the energy application for drying, the energy application for converting the curing component into the binding component may be sequentially performed, of course.

In the energy application for drying, heat and/or light known as a heat-ray such as near-infrared light may be applied so that volatilization of the solvent included in the coated product is promoted, in a range where the constituent member is not damaged.

In the energy application for curing the curing component, heat, light, or light and light may be applied so that the corresponding curing component is cured or promotes curing, considering the specific curability of the curing component included in the coated product. As an example, when the curing component is thermally curable, heat energy for promoting or causing curing may be applied. As another example, when the curing component is photocurable, light including a wavelength band required for curing the curing component applied may be applied. As a substantial example, when the curing component has UV curability, light including UV may be applied.

However, energy application for drying may be selectively performed, if necessary. As an example, drying may be performed by volatilization drying, hot air or cool air drying, heat drying (thermal energy, infrared energy, or the like), or the like, and drying may be appropriately designed and changed according to the design of the electrode manufacturing process.

As a variant of the manufacturing method of an electrode described above, an electrode active material and a metal salt-containing solution are mixed and dried to prepare an electrode active material coated with a metal salt, and an electrode slurry including the electrode active material coated with the metal salt, a binder, and if necessary, a conductive material, and the like is applied on a current collector, dried, and rolled to manufacture a metal salt-containing electrode.

As another variant of the manufacturing method of an electrode described above, an electrode slurry including an electrode active material, a metal salt, a binder, and if necessary, a conductive material, and the like is applied on a current collector, dried, and rolled to manufacture a metal salt-containing electrode. The variant as such for introducing a metal salt to an electrode active material layer is also an example which may be easily derived by a person skilled in the art based on the technical idea provided by the present invention, and is included in the scope of the present invention.

The present invention includes an electrochemical device including the electrode manufactured by the manufacturing method described above.

The present invention includes a manufacturing method of a composite separator using the coating solution described above.

The manufacturing method of a composite separator according to the present invention includes applying the coating solution described above on a porous substrate. Here, the porous substrate may include a porous film, or may include a porous film and a porous coating layer positioned on one side surface or both side surfaces of the porous film. The porous substrate may be the same as or similar to the porous substrate described above for the composite separator, and thus, the manufacturing method of a composite separator may include all of the above descriptions related to the porous substrate in the composite separator.

After the coating solution is applied, a step of applying energy to the coated product of the coating solution may be further performed, and this may be for promoting or causing drying and/or curing of the curing component, when the coating solution includes the curing component.

The application method and the specific application amount of the coating solution, energy application, and the like are the same as or similar to the above descriptions for the manufacturing method of an electrode, and thus, the manufacturing method of a composite separator may include all of the above descriptions for the manufacturing method of an electrode.

When the coating solution includes no binding component, a coating layer of a metal salt in a soluble form in the electrolyte may be formed on the porous substrate.

When the coating solution includes a binding component, a coating layer of a metal salt fixed to the porous substrate may be formed.

When the coating solution includes the binding component and the particle phase, a metal salt-containing porous coating layer having porosity by an empty space between particles of the particle phase may be formed.

The present invention includes an electrochemical device including the composite separator manufactured by the manufacturing method of a composite separator described above.

The present invention includes a manufacturing method of a separator using the coating solution described above.

The manufacturing method of a separator according to the present invention includes applying a coating solution including a metal salt; a particle phase; and a binder, a curing component, or binder and curing component on a porous film, according to an exemplary embodiment of the coating solution described above.

Thus, a separator having a metal salt-containing porous coating layer having porosity by an empty space between particles of a particle phase, including a metal salt, and being fixed to a porous film, formed on each of at least one side (side facing an electrode) surface or both side (both sides facing an electrode) surfaces may be manufactured.

After the coating solution is applied, a step of applying energy to the coated product of the coating solution may be further performed, and this may be for promoting or causing drying and/or curing of the curing component, when the coating solution includes the curing component.

The porous film may be the same as or similar to the porous film above for the composite separator, and thus, the manufacturing method of a separator may include all of the above descriptions related to the porous film in the composite separator.

The application method and the specific application amount of the coating solution, energy application, and the like are the same as or similar to the above descriptions for the manufacturing method of an electrode, and thus, the manufacturing method of a separator may include all of the above descriptions for the manufacturing method of an electrode.

The present invention includes a manufacturing method of case for an electrochemical device using the coating solution described above.

The manufacturing method of a case according to the present invention may include applying the coating solution described above on the inner surface of the case, and if necessary, further include applying energy to the coated product of the coating solution. Here, the inner surface on which the coating solution is applied may be an area to be in contact with the liquid electrolyte in assembly into an electrochemical device, of course.

The metal salt positioned in the inner surface of the case may be supplied to the electrolyte depending on the specific composition of the coating solution, and additionally or independently, flame retardancy of the case may be secured by the metal salt remaining in or positioned to be fixed to the inner surface of the case, or a smoother flow of active ions in the electrolyte may be induced.

The case may be the same as or similar to the case described above for the electrochemical device, and thus, a manufacturing method of a case may include all of the above descriptions related to the case in the electrochemical device.

The application method and the specific application amount of the coating solution, energy application, and the like are the same as or similar to the above descriptions for the manufacturing method of an electrode, and thus, the manufacturing method of a case may include all of the above descriptions for the manufacturing method of an electrode.

The present invention includes a manufacturing method of an electrochemical device, including applying the coating solution described above on a constituent member of an electrochemical device in contact with an electrolyte, and if necessary, a step of applying energy to the constituent member (coated product of the coating solution) coated with the coating solution may be further included. Here, the constituent member obtained by applying the coating solution, and if necessary, applying energy, is collectively referred to as a metal salt-containing constituent member.

When the constituent member is an electrode, the manufacturing method of an electrochemical device may include the manufacturing method of an electrode described above. In addition, when the constituent member is a separator, the manufacturing method of an electrochemical device may include the manufacturing method of a composite separator or the manufacturing method of a separator described above. When the constituent member is a case, the manufacturing method of an electrochemical device may include the manufacturing method of a case described above. When two or more constituent members are selected from an electrode, a separator, and a case, the manufacturing method of an electrochemical device may include all of the manufacturing method of each of two or more constituent members (metal salt-containing constituent members) described above.

The manufacturing method of an electrochemical device according to an exemplary embodiment may further include introducing an electrode assembly having a separator positioned between a positive electrode and a negative electrode and an electrolyte to a case having an inner housing space and closing the case, wherein one or more constituent members selected from a positive electrode, a negative electrode, a separator, and a case may be metal salt-containing constituent members.

Taking the case in which the constituent member is the separator as an example, the manufacturing method of an electrochemical device according to an exemplary embodiment may include: a) applying a coating solution on a separator (corresponding to a porous substrate) to manufacture a metal salt-containing separator (corresponding to a composite separator); b) manufacturing an electrode assembly having a metal salt-containing separator positioned between a positive electrode and a negative electrode; and c) introducing the electrode assembly and the electrolyte to a case having an inner housing space and closing the case; and furthermore, may further include d) dissolving a metal salt included in the metal salt-containing separator in the electrolyte, inside the closed case.

Since the metal salt included in the metal salt-containing separator may be dissolved into the electrolyte when being in contact with the liquid electrolyte, the concentration of the metal salt (corresponding to the salt of an active ion or an electrolyte salt) of the liquid electrolyte to be introduced (injected) in step c) may be lower than the concentration of the metal salt in the electrolyte in use of the electrochemical device. Here, the metal salt included in the metal salt-containing separator may be a salt of an active ion, of course. In addition, in step a), application may be performed so that the metal salt at or more than the content to increase the concentration of the liquid electrolyte from an injection concentration to a design concentration is positioned. As a substantial example, application may be performed so that the content of the metal salt which is a mass of the metal salt per unit area of a separator (corresponding to the porous substrate) is at a level of 0.1 to 5.0 mg/cm$^2$.

When the physical properties of flame retardancy or improved ionic conductivity are intended to be imparted to the separator, the metal salt may be one or more metal salts selected from sulfonyl group-containing metal salts, advantageously, the compounds satisfying Chemical Formulae 1 to 4. When physical properties of flame retardancy or improved ionic conductivity are intended to be imparted to the separator, in step a), application may be performed so that a metal salt dissolved into the electrolyte and remaining in the separator (corresponding to the porous substrate) or a metal salt maintained in a state of being fixed to the separator (corresponding to the porous substrate) is at a level of 0.3 to 5.0 mg/cm$^2$, 0.3 to 4.0 mg/cm$^2$, 0.3 to 3.0 mg/cm$^2$, 0.3 to 2.5 mg/cm$^2$, 0.3 to 2.0 mg/cm$^2$, 0.4 to 1.5 mg/cm$^2$, 0.5 to 1.4 mg/cm$^2$, or 0.5 to 1.2 mg/cm$^2$, based on the content of the metal salt which is the mass of the metal salt per unit area of the separator (corresponding to the porous substrate). Here, the coating solution may include a binding component, and the metal salt may be coated in a state of being fixed to the separator (corresponding to the porous substrate) by the binding component, of course.

The present invention includes the electrochemical device manufactured by the manufacturing method described above.

Hereinafter, the present invention will be described in more detail with reference to the Examples and Comparative Examples. However, the following Examples and Comparative Examples are only an example for describing the present invention in more detail, and do not limit the present invention in any way.

1) Ionic Conductivity

The ionic conductivity of the separator may be confirmed by the following method.

($IC_{separator}$)

Here, $IC_{separator}$ is an ionic conductivity of a separator in a state of being wet in a liquid electrolyte.

The ionic conductivity may be measured by taking out a separator in a state of being wet in a liquid electrolyte from a battery manufactured in the examples, or comparative examples, cutting the separator into a circle having a diameter of 18 mm, and manufacturing a coil cell (2032), or injecting the same liquid electrolyte as each example or comparative example to the separator cut into a circle having a diameter of 18 mm to wet the separator, and then using an alternating current impedance measurement method depending on temperature. The ionic conductivity measurement was performed at a frequency band of 1 MHz to 0.01 Hz using VMP3 measurement equipment.

Hereinafter, a Nyquist plot to measure the ionic conductivity (IC) of a separator in a state of being wet in the liquid electrolyte will be described in detail. The separator in a state of being wet in the liquid electrolyte represents an open form vertically rising on the Nyquist plot, as an ion conductor, and an impedance resistance value in the horizontal axis refers to a resistance to ion conductivity. The resistance value to the ion conductivity obtained from the above may be calculated from the following calculation formula:

$$IC=L/(R_{ion}\times A) \quad \text{[Calculation Formula 1]}$$

wherein L is a thickness of a specimen (thickness of separator), A is an area of a specimen, and $R_{ion}=R_2-R_1$ wherein $R_1$ is a resistance in a high frequency area on the Nyquist plot and $R_2$ is a resistance in a low frequency area on the Nyquist plot.

The ionic conductivity of the separator may be confirmed by the method described above.

2) Lithium Ion Migration Coefficient (Li Transport Number)

For measuring a lithium ion migration coefficient, a separator in a state of being wet in a liquid electrolyte was taken out of the secondary battery manufactured in the example or comparative example and then cut into a circle having a diameter of 18 mm, the separator was placed between two sheets of lithium foil having a diameter of 16 mm to manufacture a coin cell (2032), or a separator cut into a circle having a diameter of 18 mm was placed between two sheets of lithium foil having a diameter of 16 mm and the same liquid electrolyte as each of the examples and comparative examples was injected to be wet, and then a coin cell (2032) was manufactured. A primary impedance value of the manufactured coin cell was measured, a voltage of 10 mV was applied, and a current change for 3600 sec was observed, and a secondary impedance value was measured.

Thereafter, the measured values were substituted into the following Bruce and Vincent method to calculate a lithium ion migration coefficient ($t_{Li}^+$):

$$t_{Li}^+=(I^s(\Delta V-I^0R^0))/(I^0(\Delta V-I^sR^s)) \quad \text{[Calculation Formula 2]}$$

wherein $I^s$ a steady-state current, $\Delta V$ is an applied voltage, $I^0$ is an initial current, $R^0$ is an initial resistance, and $R^s$ is a steady-state resistance.

3) Analysis of Molar Concentration and Concentration Gradient of Electrolyte in Battery Material Experimentally, the concentration of metal salt in the electrode and the separator may be measured by the following analysis method, according to the following method (1) and/or method (2):

Method (1): 1) unsealing the electrochemical device (secondary battery manufactured in the example) to open at least one end portion and cutting a connection between a tab provided for electrical connection to the outside and an electrode composite of positive electrode-separator-negative electrode to recover the electrode composite; curing the recovered electrode composite at 60° C. for 24 hours or more using an epoxy resin for molding to recover the electrode composite molded in an epoxy resin; and analyzing a sample obtained by cutting the molded electrode composite into a single-sided specimen of 20 um or less using an ion beam, by neutron depth profiling to directly confirm a concentration gradient for an active metal ion of an electrode composite section, Method (2): 1) unsealing the electrochemical device (secondary battery manufactured in the example) to open at least one end portion and cutting a connection between a tab provided for electrical connection to the outside and an electrode composite of positive electrode-separator-negative electrode to recover the electrode composite; and 2) analyzing a solution obtained by immersing each of a separator, a positive electrode, and a negative electrode from the recovered electrode composite in anhydrous deuterated dimethyl sulfoxide for 24 hours, by the following method.

Analysis method: analysis by one or two or more methods selected from fluorine nuclear magnetic resonance spectroscopy (F-NMR), chlorine nuclear magnetic resonance spectroscopy (Cl-NMR), inductively coupled plasma mass spectrometry (ICP-MS), proton nuclear magnetic resonance spectroscopy (H-NMR), and X-ray photoelectron spectroscopy (XPS).

4) Battery Performance Evaluation

The initial charge/discharge capacity of the secondary battery manufactured in the example was observed at a current of 0.1 C (=0.3 mA/cm$^2$) in a voltage range of 3.0 to 4.2 V, and for the output properties (discharge properties by rate), the lithium battery was charged at a current of 0.2 C at room temperature (25° C.) and then discharged at 0.2 C/0.5 C/1.0 C/1.5 C/2.0 C.

Output capacity retention (%)=[discharge capacity at certain rate-determination/initial discharge capacity at 0.1 C]×100

The life characteristics of the lithium battery depending on the number of charge/discharge were observed at room temperature (25° C.) and at a high temperature (45° C.) under a current of 1.0 C, respectively.

Cycle capacity retention (%)=[discharge capacity at 200th cycle/discharge capacity at 1st cycle]×100

5) Porosity

The porosity (vol %) of a specimen was measured using mercury intrusion porosimetry (equipment name: AutoPore IV 9500, equipment manufacturer: Micromeritics Instrument Corp.). For excluding the effect of pores formed by sample lamination, the porosity of the sample was calculated under the condition of a pressure range of 30 psia to 60000 psia.

6) Liquid electrolyte wettability evaluation

20 μl of a liquid electrolyte in which 1 mol of $LiPF_6$ is dissolved in a mixed solvent of ethylene carbonate and dimethyl carbonate at a volume ratio of 1:1 as a reference electrolyte solution was dropped on the separator manufactured in the examples and the comparative examples and wet behavior after 60 seconds was observed.

7) Flame Retardancy Evaluation

The following flame retardancy test which is carried out at the point when a droplet does not fall from the separator to the bottom for 1 minute in the case in which the separator is impregnated with the following reference electrolyte for 1 minute and then recovered, and immediately after the recovery, the separator is positioned so that a gravity direction and an in-plane direction of the separator are parallel to each other:
  reference electrolyte: a mixed solvent of ethylene carbonate and dimethyl carbonate at a volume ratio of 1:1, a lithium salt of $LiPF_6$, a concentration of $LiPF_6$ of 1 M, and a temperature of 25° C. 5° C.,
  flame retardancy test: length of flame in the air=5 to 10 cm, temperature of flame tip=1000 to 1500° C., length of flame area which is not in contact with the separator when applying a flame to the separator=50 to 80% of the length of flame in the air, and flame movement speed in a state of being in contact with the separator=1 to 5 cm/sec.

Figure 6:
FIG. 6 is a photograph in which flame retardancy of Example 8 is evaluated.
Figure 7:
FIG. 7 is a photograph in which flame retardancy of Example 9 is evaluated.
Figure 8:
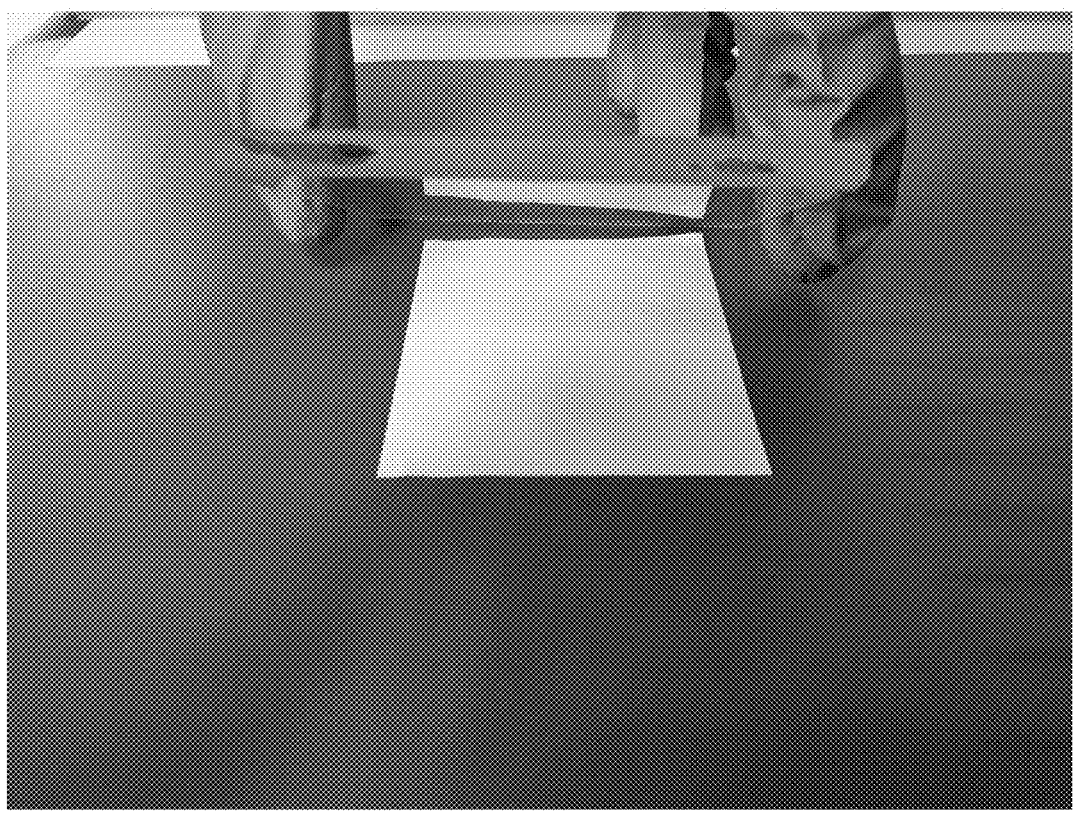
FIG. 8 is a photograph in which flame retardancy of Comparative Example 1 is evaluated.

The evaluation results according to the flame retardancy evaluation method for the separators manufactured in the examples and the comparative examples are shown in FIGS. 1 to 8. It was confirmed that as shown in FIGS. 1 to 7, all separators manufactured and evaluated in the examples did not cause a flame in the flame retardancy test, but as shown in FIG. 8, the separator manufactured in the comparative example caused flame in the flame retardancy test.

8) Scanning Electron Microscopy and Energy Dispersion Component Analysis

Scanning electron microscopy and energy dispersion component analysis were performed (field emission scanning electron microscopy with energy-dispersive X-ray spectroscopy (FE-SEM, EDS), equipment name: S-4800, equipment manufacturer: Hitachi) from the surface and section of the composite separator, the surfaces of a positive electrode and a negative electrode facing the composite separator, and a section sample. Whether the metal salt-derived element component in the sample was detected and a content difference were confirmed by surface and section morphology and component analysis.

9) X-Ray Diffraction Analysis

The composite separator manufactured in the example was cut into an appropriate size, and high-resolution X-ray diffraction analysis (high resolution X-ray diffractometer (HRXRD), equipment name: SmartLab, equipment manufacturer: RIGAKU, Cu Kα ray) was performed. It was confirmed whether the metal salt coated on the separator was a crystal phase and was dissociated by X-ray diffraction analysis of the composite separator coated with the metal salt.

Figure 9:
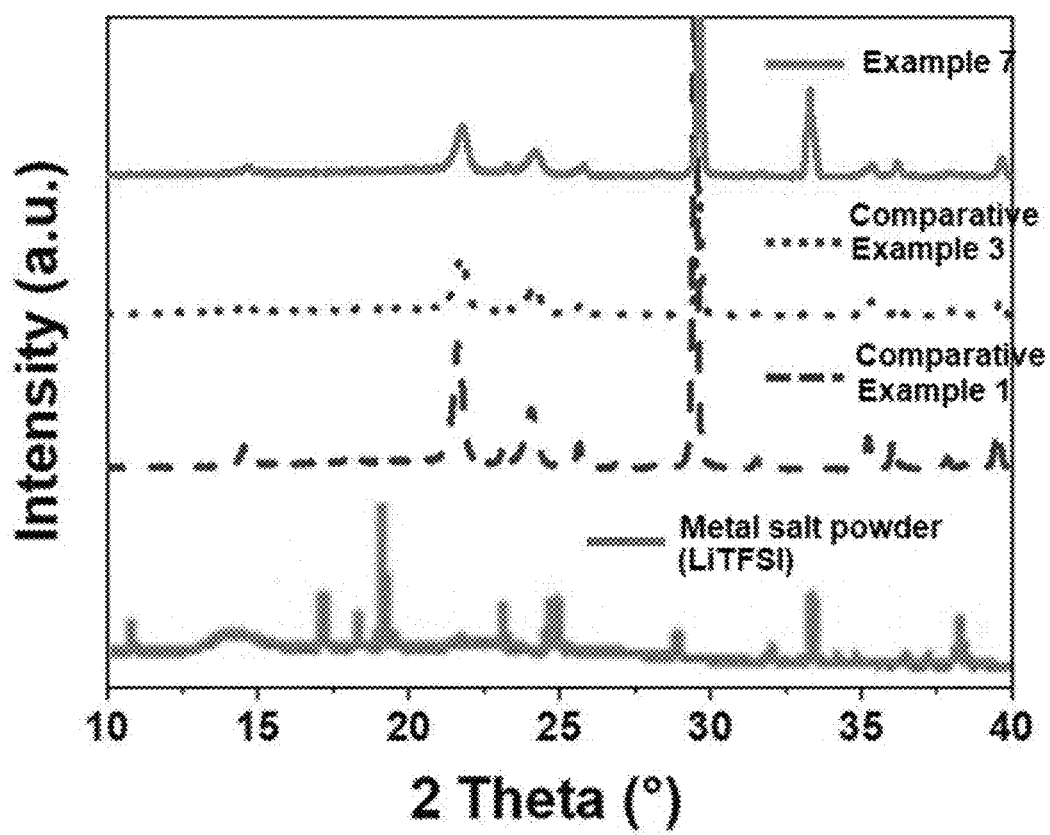
FIG. 9 shows results of evaluating X-ray diffraction analysis of Comparative Example 1, Comparative Example 3, and Example 7.

The evaluation results of a crystal state of the metal salt for the separators manufactured in the examples and the comparative examples are shown in FIG. 9. It was confirmed that the separator manufactured and evaluated in Example 7 was observed to have a diffraction peak corresponding to the lithium bis(trifluoromethanesulfonyl)imide metal salt in an undissociated crystal state (2 theta=33.3°), but the separator coated with the composite electrolyte manufactured in Comparative Example 3 was observed to have no diffraction peak representing a crystal phase due to the state of the dissociated metal salt.

10) Adhesiveness Analysis

Separator samples prepared in the examples and the comparative examples were attached to a slide glass, and a universal testing machine (equipment name: DA-01, equipment manufacturer: Petrol LAB) was used to perform adhesiveness evaluation.

Figure 10A:
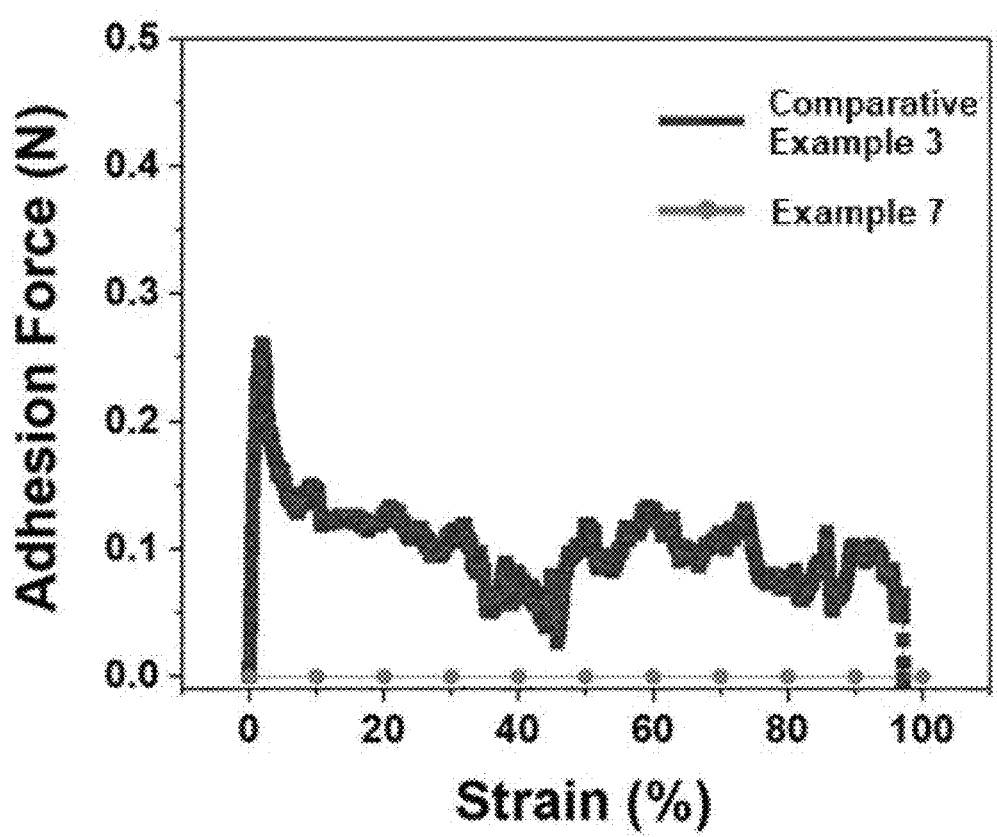
FIGS. 10A, 10B and 10C show results of evaluating adhesion force properties of Comparative Example 3 and Example 7.
Figure 10B:
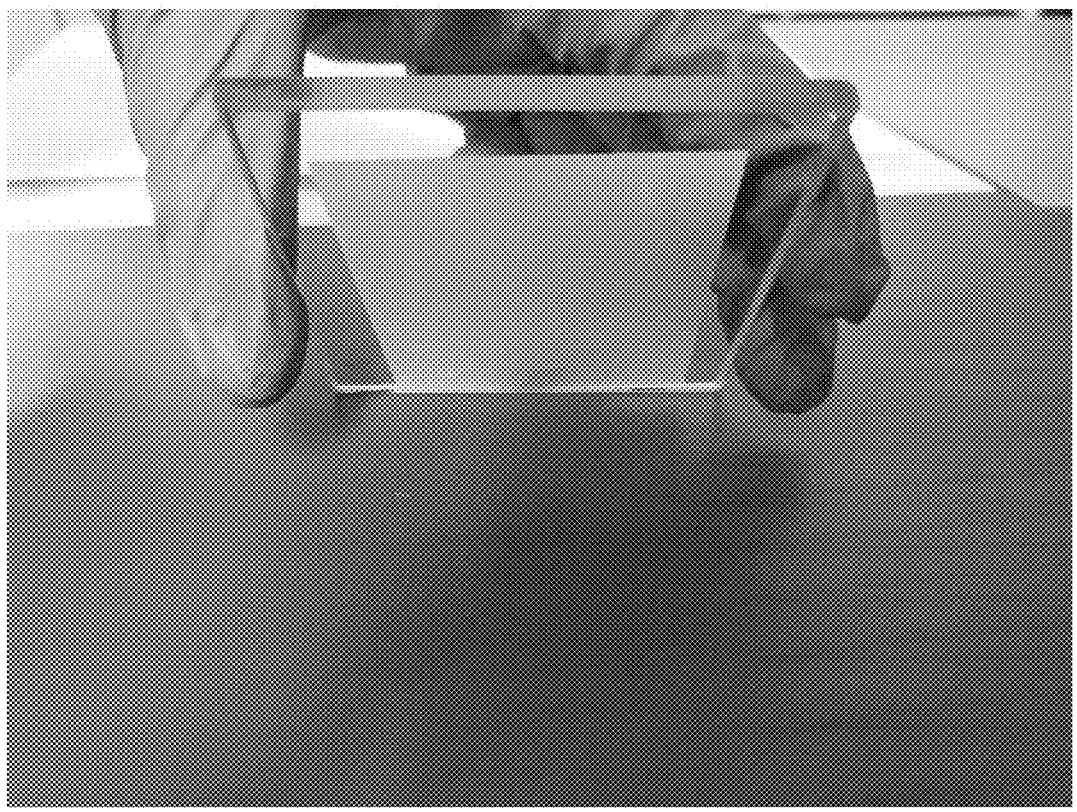
Figure 10C:
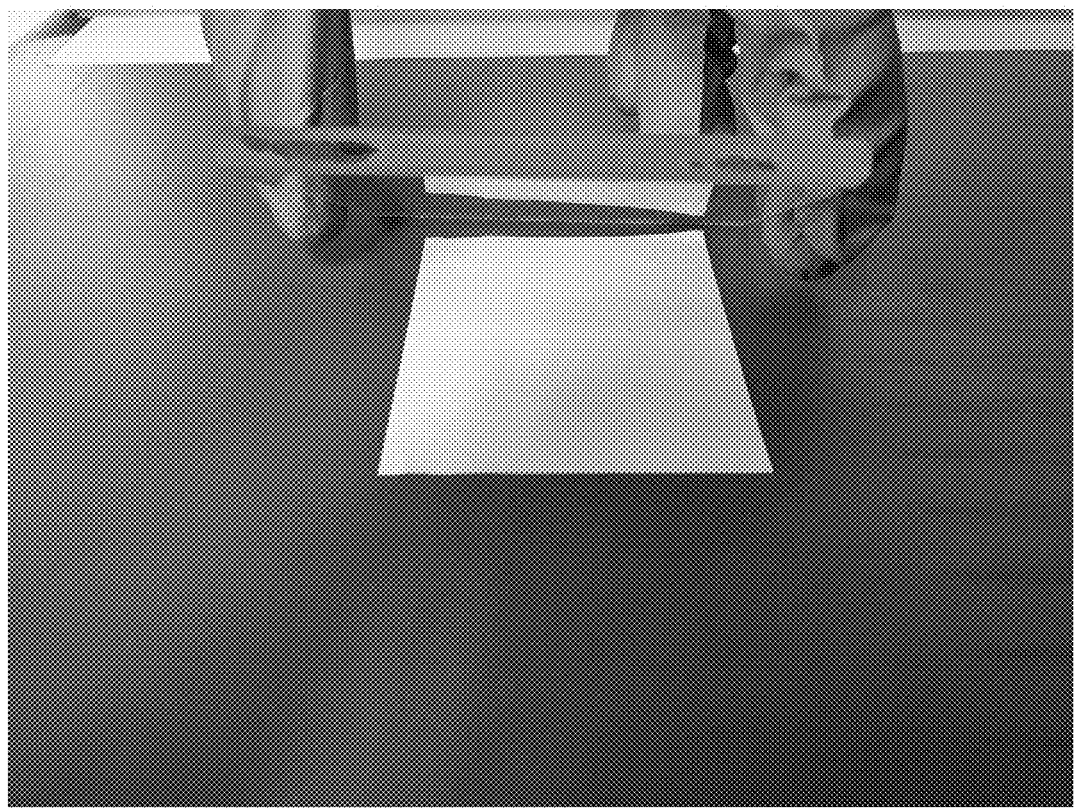

The evaluation results for the separators manufactured in the examples and the comparative examples are shown in FIGS. 10A, 10B and 10C. The separator manufactured and evaluated in Example 7 was in a completely dried state and the adhesiveness thereof was not measured, but the separator manufactured and evaluated in Comparative Example 3 had a sticky surface due to the liquid component and the dissociated metal salt present in the composite electrolyte coating layer and had high adhesiveness therefrom, and thus, was found to be inappropriate for a process such as rolling.

11) Mass Change Measurement

Figure 11:
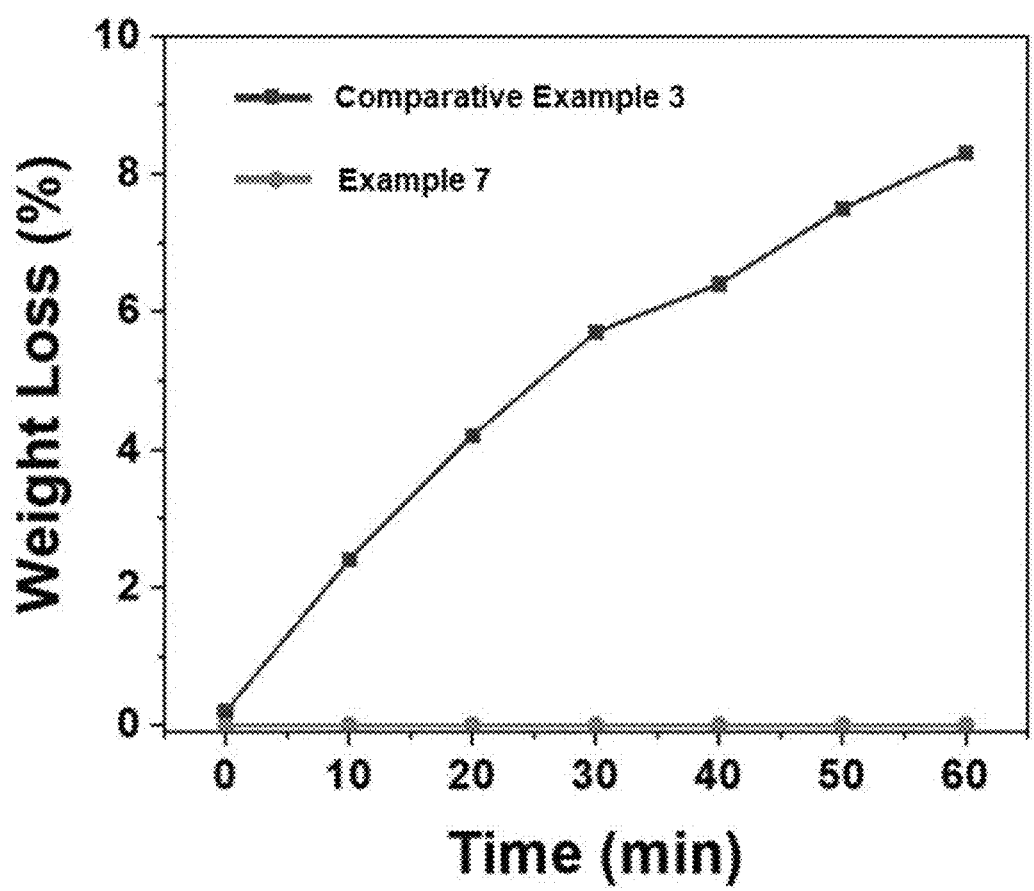
FIG. 11 shows results of evaluating volatile properties of Comparative Example 3 and Example 7.

A weight change of the composite separator over time was measured, at a temperature of 25° C. in the air immediately after manufacture. The evaluation results of the weight change of the separators manufactured in the examples and the comparative examples over time are shown in FIG. 11. It was confirmed that the separator manufactured and evaluated in Example 7 had no weight change over time since there was no liquid component, but the separator manufactured and evaluated in Comparative Example 3 was observed to have a weight change over time due to the volatilization of the liquid component present in the composite electrolyte coating layer.

12) Infrared Spectroscopy

A composite separator, and a positive electrode and a negative electrode facing the composite separator were separated from an electrode assembly which had completed an initial formation process by applying charge and discharge current, and Fourier transform infrared spectroscopy (equipment name: 670-IR, equipment manufacturer: Varian) was performed, respectively. From an absorption spectrum obtained from spectroscopy of a reflected light when infrared was irradiated, it was confirmed that the peak intensity derived from the characteristics of the material of the metal salt-derived element component in the sample was distinguishable and determinable.

13) X-Ray Photoelectron Analysis

A composite separator, and a positive electrode and a negative electrode facing the composite separator were separated from an electrode assembly which had completed an initial formation process by applying charge and discharge current, and X-ray photoelectron spectroscopy (equipment name: K-Alpha, equipment manufacturer: Thermo Fisher) was performed. It was confirmed that the absence/presence of the element including the metal salt-derived element component in the sample and the chemical bonding state were distinguishable and determinable, from energy of photoelectrons escaped by X-ray irradiated on the sample.

14) Inductively Coupled Plasma Mass Spectroscopy

A composite separator, and a positive electrode and a negative electrode facing the composite separator were separated from an electrode assembly which had completed an initial formation process by applying charge and discharge current, and inductively coupled plasma mass spectroscopy (equipment name: ELAN DRC-II, equipment manufacturer: Perkin Elmer) was performed. The metal salt-derived element component included in the sample was ionized, and the corresponding ions were separated using a mass spectrometer, thereby confirming that the presence or absence and the content of the metal salt-derived element component in the sample are distinguishable and determinable.

15) Nuclear Magnetic Resonance Spectroscopy

A composite separator, and a positive electrode and a negative electrode facing the composite separator were separated from an electrode assembly which had completed an initial formation process by applying charge and discharge current, and nuclear magnetic resonance spectroscopy (equipment name: AVANCE III HD, equipment manufacturer: Bruker) was performed. A nuclear resonance phenomenon of an atomic nucleus occurring when a magnetic field was applied to the metal salt-derived element component included in the sample was used to confirm the presence or absence of the metal salt-derived element component in the sample and the concentration were distinguishable and determinable, from information for a chemical environment around the nucleus and a spin bond with neighboring atoms.

16) Time-of-Flight Secondary Ion Mass Spectrometry

A composite separator, and a positive electrode and a negative electrode facing the composite separator were separated from an electrode assembly which had completed an initial formation process by applying charge and discharge current, and time-of-flight secondary ion mass spectrometry (equipment name: TOF-SIMS 5, equipment manufacturer: ION TOF) was performed. It was confirmed that the presence or absence of the metal salt-derived element component in the sample and the concentration were distinguishable and determinable, from the mass spectroscopy of secondary ions occurring in the sample.

17) Measurement of Dissolution Rate of Composite Separator

After the weight ($W_{dry}$) of the composite separators manufactured in the examples was measured, the composite separators were completely submerged in a reference electrolyte solution (a solution of $LiPF_6$ dissolved at a concentration of 1 M in a mixed solvent of ethylene carbonate and dimethyl carbonate at a volume ratio of 1:1) at 25° C. and allowed to be immersed for 1 hour, the composite separators were recovered and dried at 80° C. for 12 hours to obtain dried composite separators of which the weight ($W_{wet}$) was measured, and the mass of each composite separator measured and the total mass ($W_m$) of the metal salt included in the composite separators in a state immediately after manufacture were used to calculate the dissolution rate (metal salt dissolution rate) by the equation of $(W_{wet}-W_{dry})/W_m \times 100$ (%). For reducing the measurement error, 20 separators were treated identically, and $W_{dry}$ and $W_{wet}$ of the 20 whole separators were measured to calculate the dissolution rate.

Example 1

1) Manufacture of Composite Separator Including Metal Salt

Lithium perchlorate as a metal salt and dimethyl carbonate as a coating solvent were used. 20 wt % of lithium perchlorate was added to dimethyl carbonate, and stirring was performed at room temperature for 1 hour to prepare a coating solution including a metal salt.

A coating separator to which a ceramic coating layer was introduced (ceramic coating layer having a total thickness of 17 μm, a fabric thickness of 15 μm (polyethylene), and each thickness of both surfaces of 1 μm) was used as a porous substrate. The coating solution including a metal salt was coated on one surface of the porous substrate using a doctor blade, the substrate was dried at 60° C. for 1 hour to volatilize the solvent for coating, thereby manufacturing a composite separator including a metal salt. The contents of the metal salt applied on one surface of the porous substrate are listed in Table 1.

As a result of performing a dissolution rate test of the manufactured composite separators, it was confirmed that the metal salt dissolution rate reached 65%.

2) Manufacture of Lithium Ion Secondary Battery

Manufacture of positive electrode: Solids of 96 wt % of a lithium-nickel-manganese-cobalt composite oxide ($LiNi_{0.6}Co_{0.2}Mn_{0.2}O_2$) as a reference positive electrode active material, 2 wt % of Super-P™ having an average diameter of 40 nm as a conductive material, and 2 wt % of polyvinylidene fluoride as a binder, based on 100 wt % of a solid content were added to N-methyl-2-pyrrolidone as an organic solvent so that the solid content was 50 wt % to prepare a positive electrode active material composition (positive electrode mixture slurry).

The positive electrode active material composition was applied on an aluminum thin film having a thickness of 20 μm using a doctor blade, and the film was dried at 120° C. and then rolled by a roll press to prepare a positive electrode coated with an active material layer having a thickness of 50 μm. The porosity was 15 vol %.

Manufacture of negative electrode: Water was added to solids of 96 wt % of natural graphite powder as a reference negative electrode active material, 2 wt % of carbon black having an average particle diameter of 40 nm as a conductive material, 1 wt % of a styrene-butadiene rubber as a binder, and 1 wt % of carboxymethyl cellulose, based on 100 wt % of a solid content to prepare a negative electrode active material composition (negative electrode mixture slurry). The negative electrode active material composition was applied on an copper thin film having a thickness of 20 μm using a doctor blade, and the film was dried at 120° C. and then rolled by a roll press to prepare a negative electrode coated with an active material layer having a thickness of 65 μm. The porosity was 20 vol %.

Manufacture of secondary battery: The positive electrode, the negative electrode, and the composite separator including a metal salt manufactured were laminated to manufacture a battery assembly, the battery assembly was sealed in a battery case, and then a liquid electrolyte in which 1 M LiPF$_6$ was dissolved was injected to a mixed solvent of ethylene carbonate and dimethyl carbonate at a volume ratio of 1:1 to manufacture a cell (coin cell and pouch cell).

For evaluating the physical properties of the manufactured battery, a battery in a state of completing an initial formation process by applying a charge and discharge current was disassembled, and the composite separator, and the positive electrode and the negative electrode facing the composite separator were separated from the electrode assembly and the physical properties were measured, which are shown in Table 1. The concentrations of the electrolyte solution in the composite separator, the positive electrode, and the negative electrode were analyzed using nuclear magnetic resonance spectroscopy, and an electrolyte solution according to the measured concentration was separately prepared and it was confirmed whether the same analysis results were obtained, thereby verifying the measured concentration.

Example 2

Batteries (coin cell and pouch cell) were manufactured in the same manner as in Example 1, except that the composite separator was manufactured using a porous film to which a ceramic coating layer was not introduced (polyethylene having a thickness of 9 μm) as the porous substrate of the composite separator including a metal salt.

Example 3

Batteries (coin cell and pouch cell) were manufactured in the same manner as in Example 1, except that the composite separator was manufactured using lithium trifluoromethanesulfonate as the metal salt.

The physical properties of the manufactured batteries were measured and are shown in Table 1, and the flame retardancies of the batteries were measured and the results are shown in FIG. 1. As shown in FIG. 1, even when the porous substrate included only the crystalline metal salt containing a sulfonyl group, no flame occurred in the flame retardancy test.

As a result of performing a dissolution rate test of the manufactured composite separators, it was confirmed that the metal salt dissolution rate reached 80%.

Example 4

Batteries (coin cell and pouch cell) were manufactured in the same manner as in Example 3, except that the composite separator was manufactured using a porous film to which a ceramic coating layer was not introduced (polyethylene having a thickness of 9 μm) as the porous substrate of the composite separator including a metal salt.

Figure 2:
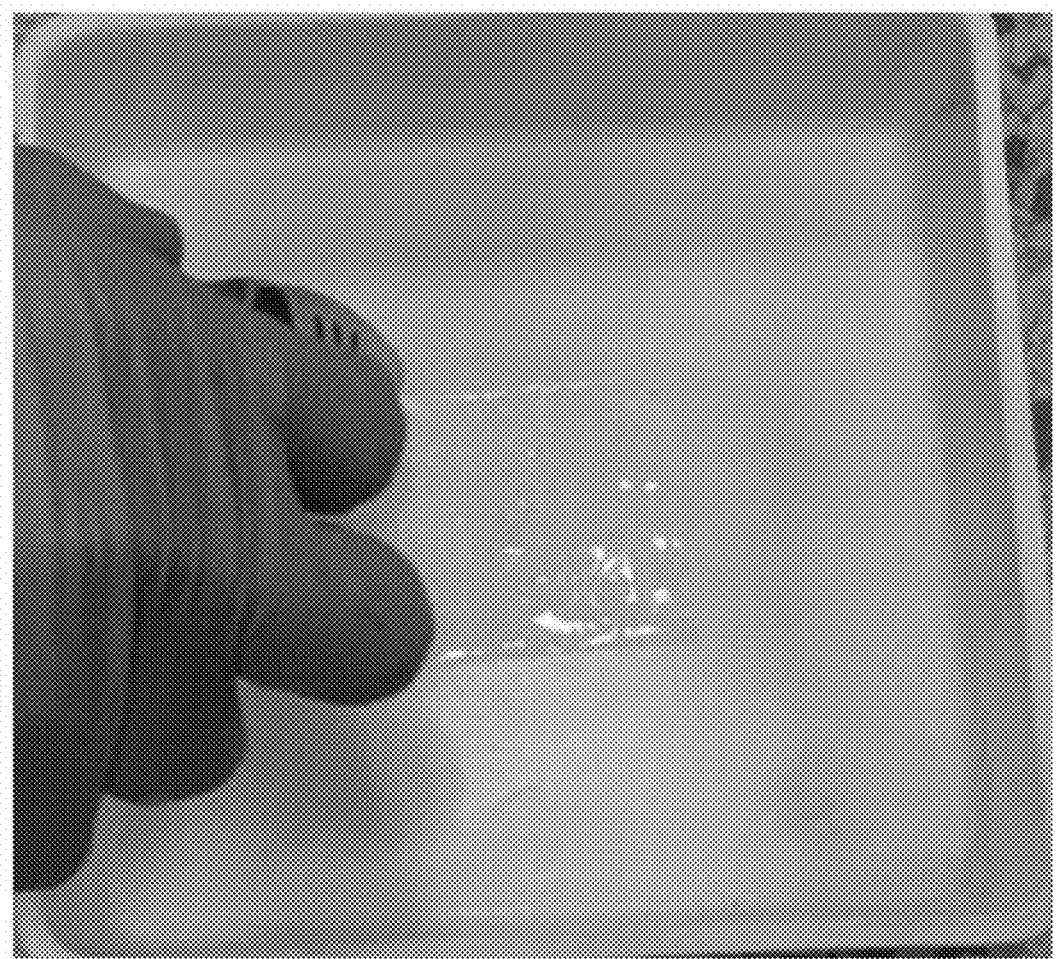
FIG. 2 is a photograph in which flame retardancy of Example 4 is evaluated.

The physical properties of the manufactured batteries were measured and are shown in Table 1, and the flame retardancies of the batteries were measured and the results are shown in FIG. 2. As shown in FIG. 2, even when the polyethylene porous substrate provided with no ceramic coating layer was coated with only a crystalline metal salt containing a sulfonyl group, no flame occurred in the flame retardancy test.

Example 5

A composite separator and batteries (coin cell and pouch cell) were manufactured in the same manner as in Example 1, except that a coating solution was prepared by adding each of 20 wt % of lithium trifluoromethanesulfonate, 3.5 wt % of trimethylolpropane ethoxylate triacrylate, and 0.35 wt % of hydroxymethyl phenyl propanone as a photoinitiator to dimethyl carbonate, as a coating solution including a metal salt and applied, and ultraviolet rays were irradiated at 2000 mW/cm$^2$ for 20 seconds to perform crosslinking.

Figure 3:
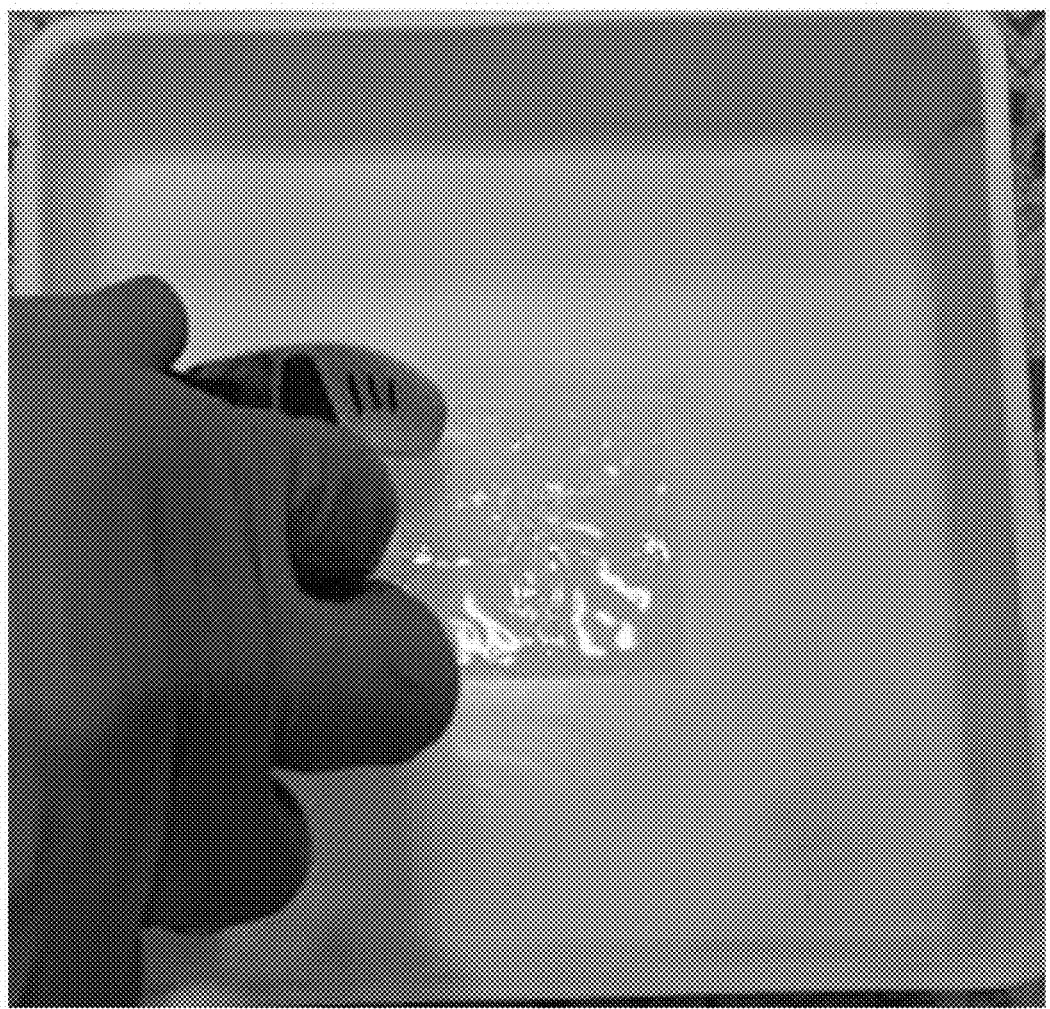
FIG. 3 is a photograph in which flame retardancy of Example 5 is evaluated.

The physical properties of the manufactured batteries were measured and are shown in Table 1, and the flame retardancies of the batteries were measured and the results are shown in FIG. 3. As shown in FIG. 3, even when the crystalline metal salt containing a sulfonyl group was bound to the porous substrate by the binding component, no flame occurred in the flame retardancy test.

Example 6

Batteries (coin cell and pouch cell) were manufactured in the same manner as in Example 5, except that the composite separator was manufactured using a porous film to which a ceramic coating layer was not introduced (polyethylene having a thickness of 9 μm) as the porous substrate of the composite separator including a metal salt.

Figure 4:
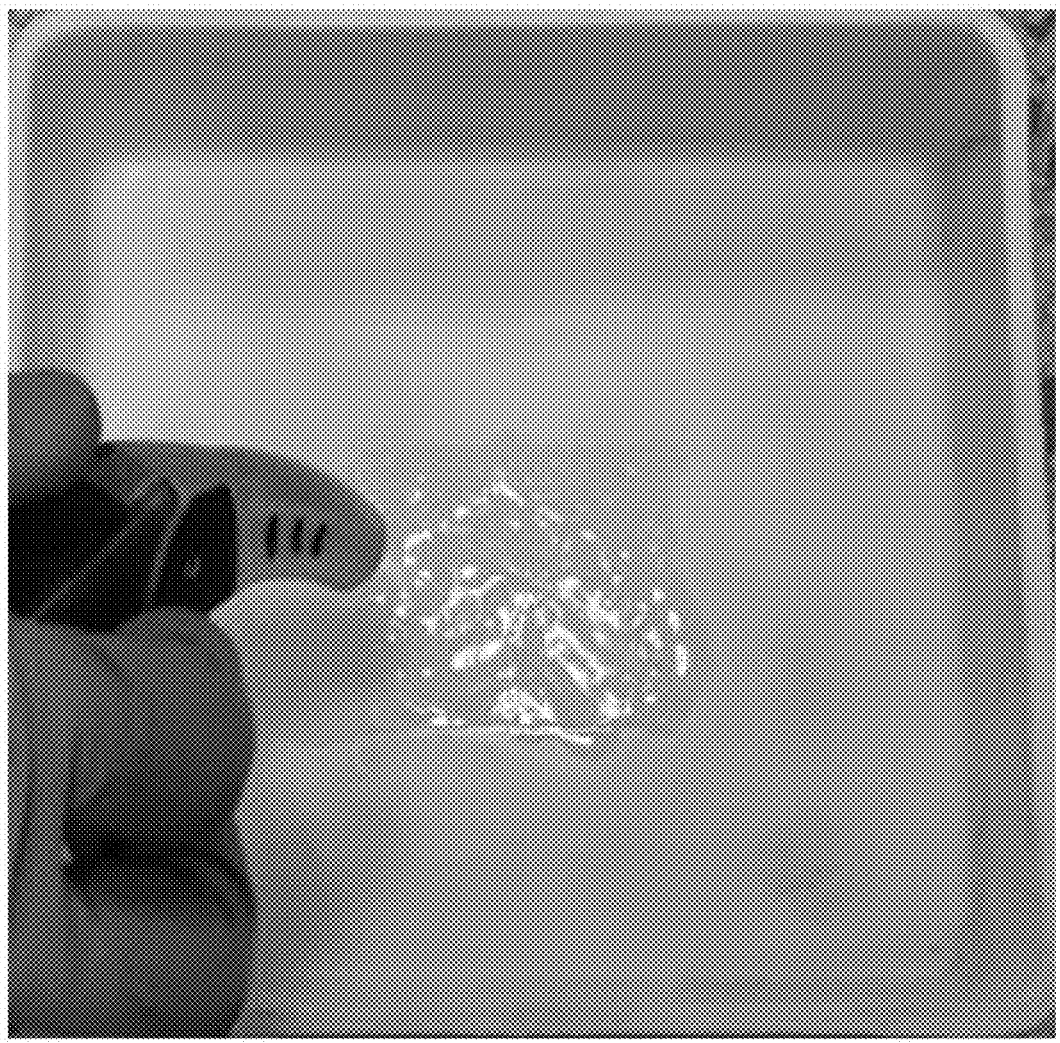
FIG. 4 is a photograph in which flame retardancy of Example 6 is evaluated.

The physical properties of the manufactured batteries were measured and are shown in Table 1, and the flame retardancies of the batteries were measured and the results are shown in FIG. 4. As shown in FIG. 4, even when the crystalline metal salt containing a sulfonyl group was bound to the polyethylene porous substrate provided with no porous inorganic layer by the binding component, no flame occurred in the flame retardancy test.

Example 7

A coating solution including 6.65 wt % of silica (SiO$_2$), 0.35 wt % of a polyvinylidene fluoride hexafluoropropylene copolymer (PVDF-HFP), 20 wt % of lithium bis(trifluoromethanesulfonyl)imide, and a balance of acetone was prepared as a coating solution including a metal salt. The polyvinylidene fluoride hexafluoropropylene copolymer as a polymer was first dissolved in acetone, and the residual components were added to the solution in proportions.

Batteries (coin cell and pouch cell) were manufactured in the same manner as in Example 1, except that a porous film to which a ceramic coating layer was not introduced (polyethylene having a thickness of 9 μm) was used as the porous substrate of the composite separator including a metal salt, and a ceramic coating layer including a metal salt was formed on both surfaces of the porous substrate using the prepared coating solution and a dip coating method to manufacture a composite separator having a thickness of 13 μm.

Figure 5:
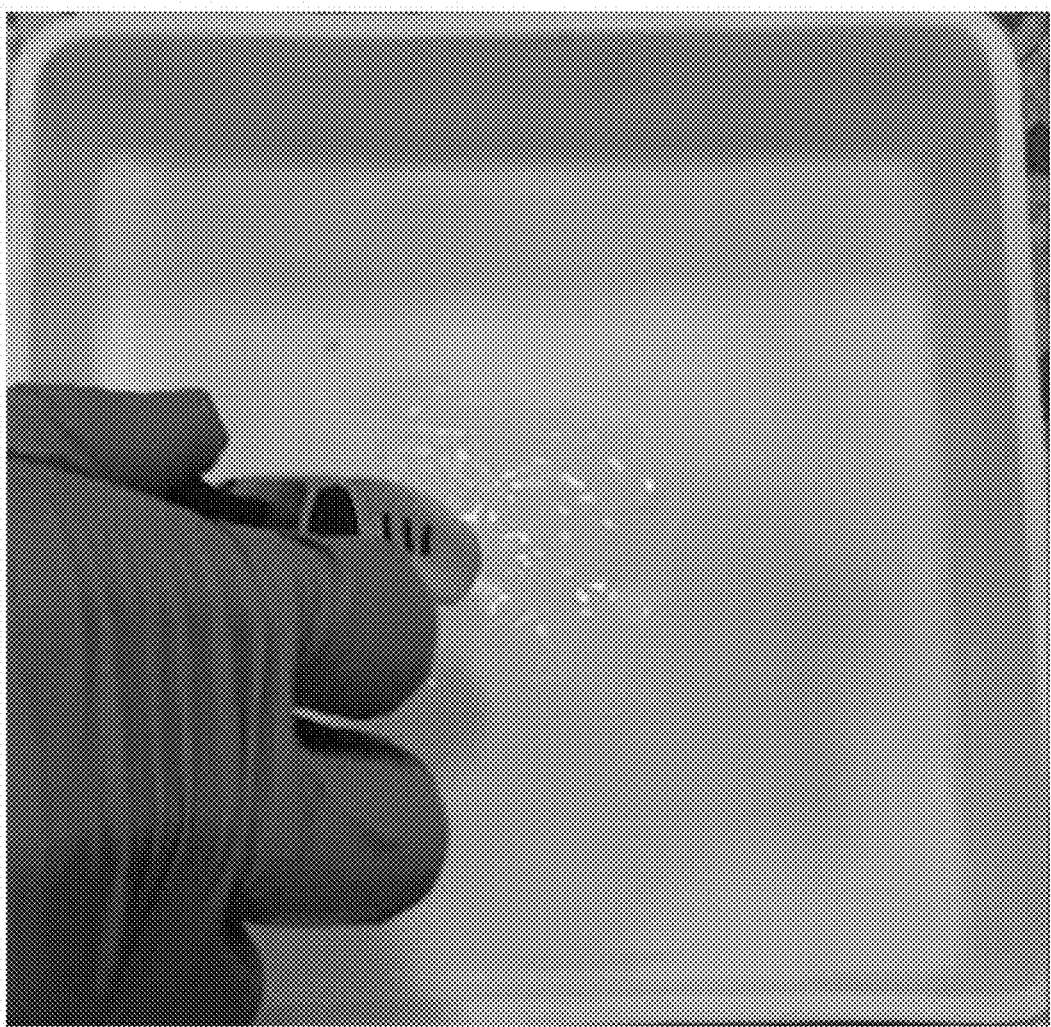
FIG. 5 is a photograph in which flame retardancy of Example 7 is evaluated.

The physical properties of the manufactured batteries were measured and are shown in Table 1, and the flame retardancies of the batteries were measured and the results are shown in FIG. 5. As shown in FIG. 5, even when the ceramic coating layer was formed on the polyethylene porous film and also the crystalline metal salt containing a sulfonyl group was bound in the ceramic coating layer by the binding component, no flame occurred in the flame retardancy test. In addition, X-ray diffraction pattern results for evaluating crystal characteristics of the manufactured separator are shown in FIG. 9, and the results of evaluating volatilization properties are shown in FIG. 11.

Example 8

Batteries (coin cell and pouch cell) were manufactured in the same manner as in Example 7, except that a battery assembly was manufactured in the same manner as in Example 7 and sealed in a battery case, and then a liquid electrolyte in which 1 M $LiPF_6$ was dissolved in a mixed solvent of 1,2-dimethoxy ethane (DME) and 1, 3-dioxolane (DOL) at a volume ratio of 1:1 was injected.

The physical properties of the manufactured batteries were measured and are shown in Table 1, and the flame retardancies of the batteries were measured and the results are shown in FIG. 6. As shown in FIG. 6, the manufactured composite separator did not cause a flame even when the solvent of the electrolyte solution to be contacted in the battery was changed, and thus, it was found that flame retardancy was secured regardless of the specific kind of solvent.

Example 9

The pouch cell manufactured in Example 7 was subjected to formation twice at a current of 0.1 C (=0.3 $mA/cm^2$) in a voltage range of 3.0 to 4.2 V, the battery in a state of completing 100 charge/discharge cycles at a current of 1.0 C was disassembled, the composite separator, and the positive electrode and the negative electrode facing the composite separator were separated from the electrode assembly and the physical properties were measured, and the results are shown in Table 1 and the results of evaluating flame retardancy are shown in FIG. 7. As shown in FIG. 7, even when charge and discharge of the battery provided with the manufactured composite separator were repeatedly performed, no flame occurred in the flame retardancy test, and thus, it was found that flame retardancy was secured substantially regardless of whether the battery was used or how long the battery was used.

Comparative Example 1

Batteries (coin cell and pouch cell) were manufactured in the same manner as in Example 1, except that a separator (ceramic coating layer having a total thickness of 17 μm, a fabric thickness of 15 μm (polyethylene), and each thickness of both surfaces of 1 μm) including no metal salt was used.

The physical properties of the manufactured batteries were measured and are shown in Table 1, the flame retardancies of the batteries was measured and the results are shown in FIG. 8, and the results of evaluating crystal characteristics are shown in FIG. 9. As shown in FIG. 8, it was confirmed that flame occurred in the flame retardancy evaluation.

Comparative Example 2

Batteries (coin cell and pouch cell) were manufactured in the same manner as in Comparative Example 1, except that a liquid electrolyte in which 2.5 M $LiPF_6$ was dissolved was injected instead of the liquid electrolyte in which 1 M $LiPF_6$ was dissolved.

The physical properties of the manufactured batteries were measured, and are shown in Table 1.

Comparative Example 3

Polyethylene oxide was dissolved at 2 wt % in an acetonitrile solvent, and an electrolyte solution in which 1.5 M lithium bis(trifluoromethanesulfonyl)imide was dissociated in 1-methyl-1-propylpyrrolidinium bis(fluorosulfonyl)imide (PYR13FSI) which is an ionic liquid was added. The content of the ionic liquid was 80 parts by weight and the content of polyethylene oxide was 20 parts by weight, based on 100 parts by weight of the total weight of the ionic liquid and polyethylene oxide, in the composite electrolyte composition.

Batteries (coin cell and pouch cell) were manufactured in the same manner as in Example 1, except that the composite electrolyte composition was coated at a thickness of 5 m on each of both surfaces of the porous substrate as a porous film (polyethylene having a thickness of 9 μm) using a dip coating method, and dried at 60° C. for 1 hour to manufacture a composite separator.

The physical properties of the manufactured batteries were measured and are shown in Table 1, and the results of evaluating the crystal characteristics of the manufactured separator are shown in FIG. 9, the results of evaluating adhesiveness characteristics are shown in FIGS. 10A, 10B and 10C, and the results of evaluating volatilization properties are shown in FIG. 11.

TABLE 1

| | Projected image metal salt content (mg/cm²) | Injected electrolyte concentration (M) | Electrolyte concentration (M) measured after battery formation | | | Separator ionic conductivity (mS/cm) | Separator Li ion migration coefficient ($t_{Li^+}$) |
|---|---|---|---|---|---|---|---|
| | | | Separator | Positive electrode | Negative electrode | | |
| Example 1 | 1.0 | 1.0 | 2.51 | 1.21 | 1.42 | 0.63 | 0.34 |
| Example 2 | 1.0 | 1.0 | 2.48 | 1.23 | 1.43 | 0.61 | 0.32 |
| Example 3 | 2.0 | 1.0 | 2.53 | 1.48 | 1.52 | 0.72 | 0.42 |
| Example 4 | 2.0 | 1.0 | 2.47 | 1.51 | 1.54 | 0.71 | 0.41 |
| Example 5 | 2.0 | 1.0 | 2.74 | 1.35 | 1.47 | 0.68 | 0.55 |
| Example 6 | 2.0 | 1.0 | 2.69 | 1.38 | 1.51 | 0.65 | 0.53 |
| Example 7 | 2.0 | 1.0 | 2.89 | 1.24 | 1.41 | 0.82 | 0.68 |
| Example 8 | 2.0 | 1.0 | 2.87 | 1.25 | 1.42 | 0.62 | 0.67 |
| Example 9 | 2.0 | 1.0 | 2.86 | 1.25 | 1.43 | 0.81 | 0.66 |

TABLE 1-continued

| | Projected image metal salt content (mg/cm²) | Injected electrolyte concentration (M) | Electrolyte concentration (M) measured after battery formation | | | Separator ionic conductivity (mS/cm) | Separator Li ion migration coefficient ($t_{Li^+}$) |
|---|---|---|---|---|---|---|---|
| | | | Separator | Positive electrode | Negative electrode | | |
| Comparative Example 1 | — | 1.0 | 0.98 | 1.01 | 1.0 | 1.06 | 0.23 |
| Comparative Example 2 | — | 2.5 | 2.49 | 2.51 | 2.49 | 0.07 | 0.27 |
| Comparative Example 3 | 2.0 | 1.0 | 2.37 | 1.03 | 1.02 | 0.02 | 0.31 |

As seen from FIG. 9 (X-ray diffraction pattern of LiTFSi powder which was the metal salt used in the composite separator manufacture as a reference is shown together at the bottom) showing X-ray diffraction measurement results for crystallinity evaluation, it was found that the composite separator manufactured in Example 7 included a metal salt in a crystal state. In addition, though not shown in the drawing, the composite separators manufactured in the examples all included a metal salt in a crystal state as in Example 7. It was confirmed that when the separator including a crystalline metal salt containing a sulfonyl group was provided in a battery, excellent flame retardancy was secured as in FIGS. 1 to 7. In addition, as in Table 1, it was found that when the composite separator included a crystalline metal salt, both the ionic conductivity and the lithium ion migration coefficient were increased.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A flame-retardant separator comprising a porous substrate and a crystalline metal salt containing a sulfonyl group,
    wherein the flame-retardant separator has at least one or more diffraction peak of the crystalline metal salt in an X-ray diffraction pattern through X-ray diffraction (XRD) analysis using Cu Kα, and wherein the flame-retardant separator does not cause a flame from the separator in a flame retardancy test, which is carried out at a point when a droplet does not fall from the separator for 1 minute after the separator is impregnated with a reference electrolyte for 1 minute and then recovered, wherein, in the flame retardancy test, the separator is positioned so that a gravity direction and an in-plane direction of the separator are parallel to each other;
    wherein the reference electrolyte comprises a mixed solvent of ethylene carbonate and dimethyl carbonate at a volume ratio of 1:1, a lithium salt of LiPF$_6$, a concentration of LiPF$_6$ of 1 M, and a temperature of 25° C.±5° C., and
    wherein, in the flame retardancy test, a length of a flame in the air=5 to 10 cm, a temperature of a flame tip=1000 to 1500° C., a length of a flame area, which is not in contact with the separator when applying the flame to the separator=50 to 80% of the length of the flame in the air, and a flame movement speed in a state of being in contact with the separator=1 to 5 cm/sec.

2. The flame-retardant separator of claim 1, wherein the porous substrate includes a porous film, and the crystalline metal salt is positioned on a surface of the porous film.

3. The flame-retardant separator of claim 1, wherein
    the crystalline metal salt containing the sulfonyl group is any one or more selected from compounds satisfying the following Chemical Formulae 1 to 4:

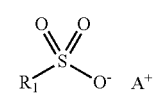 

(Chemical Formula 1)

wherein A$^+$ is a monovalent cation, and R$_1$ is F, CFH$_2$, CF$_2$H, or C$_n$F$_{2n+1}$ where n is a natural number of 1 or more,

(Chemical Formula 2)

wherein A$^{2+}$ is a divalent cation, and R$_1$ is F, CFH$_2$, CF$_2$H, or C$_n$F$_{2n+1}$ where n is a natural number of 1 or more,

(Chemical Formula 3)

wherein A$^+$ is a monovalent cation, and R$_1$ and R$_2$ are independently of each other F, CFH$_2$, CF$_2$H, or C$_n$F$_{2n+1}$ where n is a natural number of 1 or more, and (Chemical Formula 4)

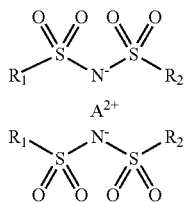

wherein $A^{2+}$ is a divalent cation, and $R_1$ and $R_2$ are independently of each other F, $CFH_2$, $CF_2H$, or $C_nF_{2n+1}$ where n is a natural number of 1 or more.

4. The flame-retardant separator of claim 1, wherein the flame-retardant separator is a salt source for supplying the crystalline metal salt to an electrolyte provided in an electrochemical device.

5. The flame-retardant separator of claim 1, wherein
the porous substrate includes a porous film and a porous coating layer positioned on at least one side surface of the porous film, and
the flame-retardant separator further comprises a coating layer that comprises the crystalline metal salt which is positioned between the porous film and the porous coating layer, in a surface area of the porous coating layer, or between the porous film and the porous coating layer and in the surface area of the porous coating layer, respectively.

6. The flame-retardant separator of claim 1, wherein a content of the crystalline metal salt is 0.1 to 5.0 mg/cm², the content of the crystalline metal salt being a mass of the crystalline metal salt per unit area of the porous substrate.

7. The flame-retardant separator of claim 1, wherein a metal ion of the crystalline metal salt includes an active ion, the active ion being a metal ion participating in an electrochemical reaction of an electrochemical device provided with the flame-retardant separator.

8. The flame-retardant separator of claim 1, wherein the flame-retardant separator satisfies the following Equation 1:

$$5(\%) \leq (W_{dry} - W_{wet})/W_m \times 100(\%) \quad \text{(Equation 1)}$$

wherein $W_{dry}$ is a mass of the flame-retardant separator before the flame-retardant separator comes into contact with an electrolyte solution, $W_{wet}$ is a mass of the flame-retardant separator which is recovered and dried after immersing the flame-retardant separator in a reference electrolyte solution in which $LiPF_6$ is dissolved at a concentration of 1 M in a mixed solvent of ethylene carbonate and dimethyl carbonate at a volume ratio of 1:1 at a temperature of 25° C. for 1 hour, and $W_m$ is a mass of the crystalline metal salt included in the flame-retardant separator before the flame-retardant separator comes into contact with the electrolyte solution.

9. The flame-retardant separator of claim 1, wherein the crystalline metal salt is fixed by any one or more binding components selected from linear polymers and crosslinked polymers.

10. The flame-retardant separator of claim 9, wherein the fixing is performed by curing a curing component having curability, which is converted into the one or more binding components by curing, in a state of being mixed with the crystalline metal salt.

11. The flame-retardant separator of claim 1, wherein
the porous substrate includes a porous film and a porous coating layer positioned on at least one side surface of the porous film, and
the crystalline metal salt is positioned in one or more areas of an interface between the porous film and the porous coating layer, an inside of the porous coating layer, and a surface area of the porous coating layer.

12. The flame-retardant separator of claim 11, wherein the porous coating layer comprises particles selected from the group consisting of inorganic particles, organic particles, organic and inorganic composite particles and mixed particles thereof.

13. The flame-retardant separator of claim 1, further comprising a coating layer that comprises the crystalline metal salt, positioned on one side surface of the porous substrate.

14. The flame-retardant separator of claim 13, wherein the coating layer including the crystalline metal salt further includes one or more polymers selected from linear polymers and crosslinked polymers.

15. An electrochemical device comprising the flame-retardant separator of claim 1.

16. The electrochemical device of claim 15, wherein a molar concentration of an active ion salt included in the electrolyte is 0.5 to 6.0 M, the active ion being a metal ion participating in an electrochemical reaction of the electrochemical device.

* * * * *